United States Patent
Sullivan et al.

(10) Patent No.: US 6,210,824 B1
(45) Date of Patent: Apr. 3, 2001

(54) CURRENT INTERRUPT APPARATUS FOR ELECTROCHEMICAL CELLS

(75) Inventors: Steven K. Sullivan, Cranston, RI (US); Mark G. Dexter, Acushnet; Kevin R. French, North Dighton, both of MA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/216,046

(22) Filed: Dec. 18, 1998

Related U.S. Application Data
(60) Provisional application No. 60/071,557, filed on Jan. 15, 1998.

(51) Int. Cl.$^7$ .................. H01M 2/12; H01M 2/00
(52) U.S. Cl. ................... 429/53; 429/54; 429/56; 429/59; 429/61; 429/72; 429/7
(58) Field of Search .................. 429/53, 7, 56, 429/61, 54, 55, 72, 59

(56) References Cited

U.S. PATENT DOCUMENTS

| | | |
|---|---|---|
| 4,943,497 | 7/1990 | Oishi et al. . |
| 5,171,648 * | 12/1992 | Beard ..................... 429/61 |
| 5,464,705 | 11/1995 | Wainwright . |
| 5,567,539 | 10/1996 | Takahashi et al. . |
| 5,707,756 | 1/1998 | Inoue et al. . |
| 5,750,277 | 5/1998 | Vu et al. . |
| 5,998,051 * | 12/1999 | Poirier et al. ............. 429/7 |

FOREIGN PATENT DOCUMENTS

WO 97/38455 * 10/1997 (WO) ............... H01M/2/34

* cited by examiner

Primary Examiner—Stephen Kalafut
Assistant Examiner—Angela J. Martin
(74) Attorney, Agent, or Firm—Russell E. Baumann; Frederick J. Telecky, Jr.

(57) ABSTRACT

End cap apparatus (2) is received in the open end of an electrochemical cell casing (6) and is particularly adapted to be crimped thereto electrically separated from the casing by a gasket (4). The end cap apparatus incorporates current interrupt safety protection features including high rate overcharge protection through an over-temperature and/or low pressure switch (22, 12d–18, 18', 18", 118a), low rate overcharge and overdischarge protection through a low pressure switch (12d–18, 18', 18", 118a), extended short circuit protection through an over-temperature switch driven by $I^2r$ heating of internal components (20, 22, 16, 12, 12', 16', 16", 16'", 12$^v$, 102, 122, 120), and pressure venting through a frangible portion (12e) of a diaphragm. The diaphragm can be integrally formed with a header (12, 12", 12'", 12$^{iv}$) or can be a separate element (32, 82, 92, 108, 112, 112' 112", 112'").

12 Claims, 20 Drawing Sheets

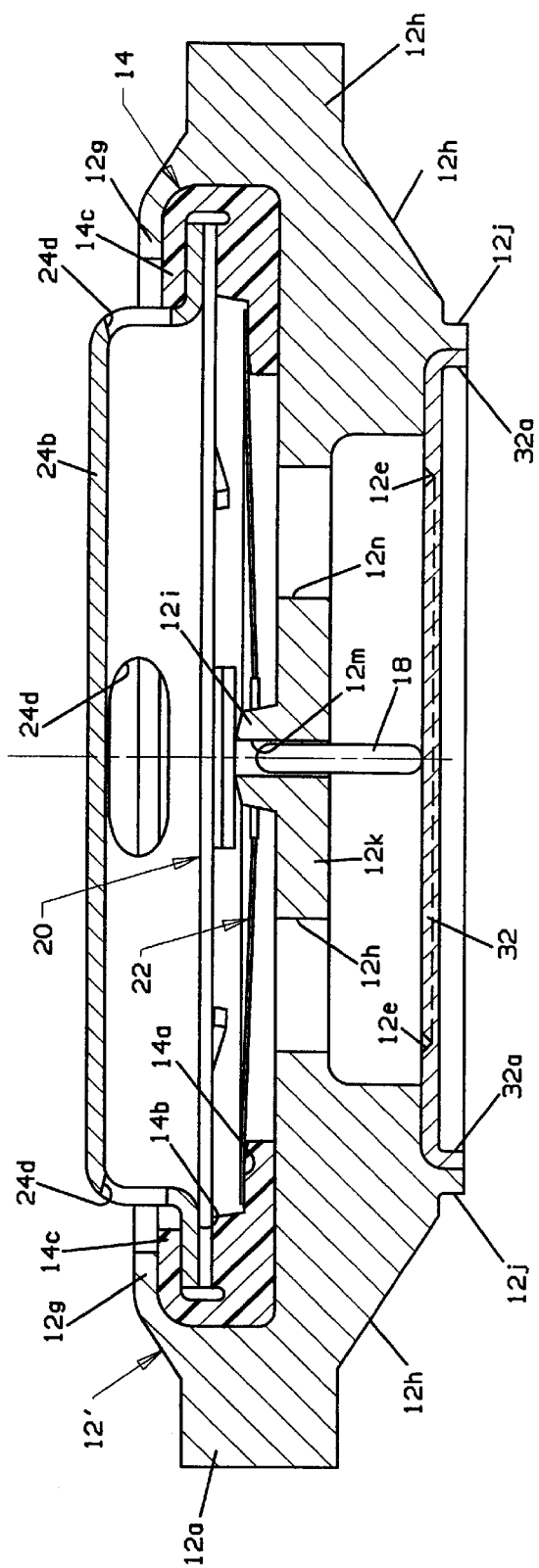
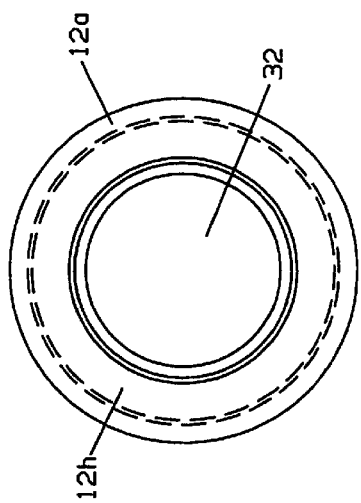
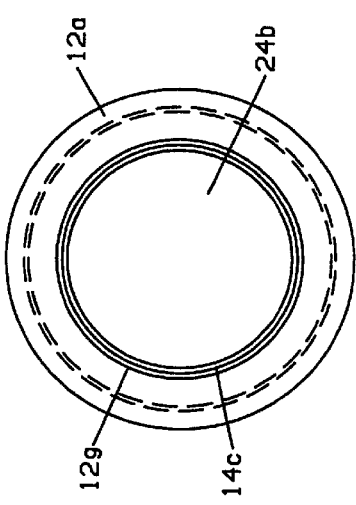
FIG 4
FIG 4b
FIG 4a

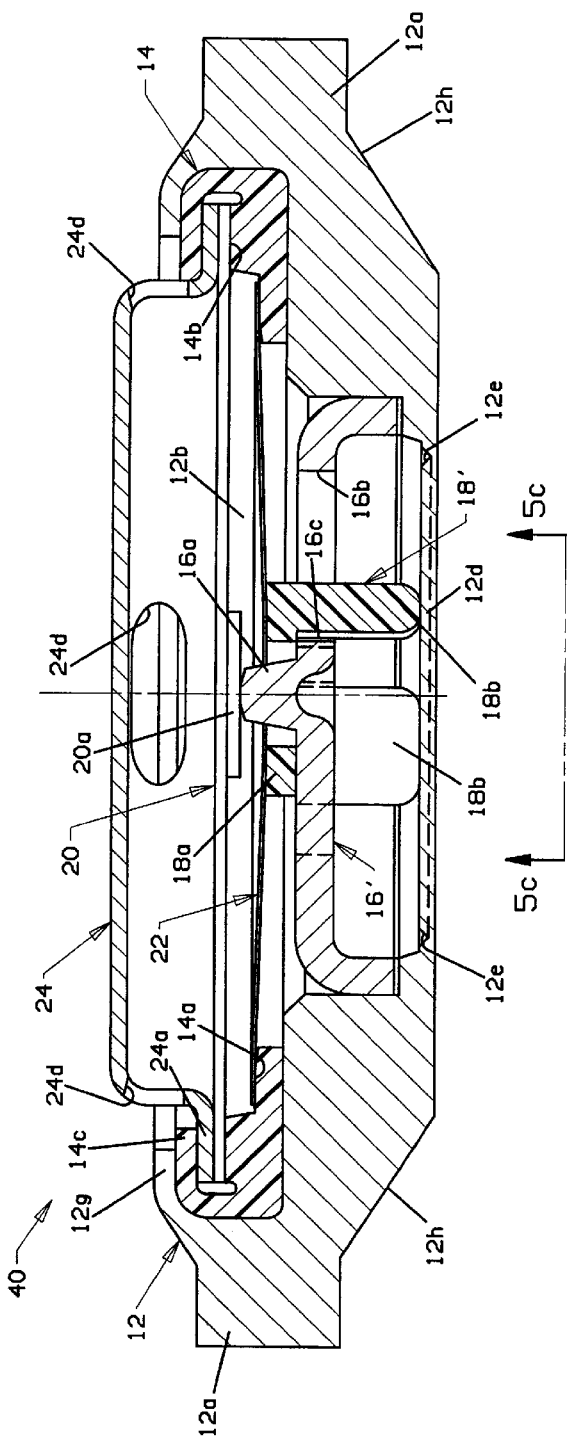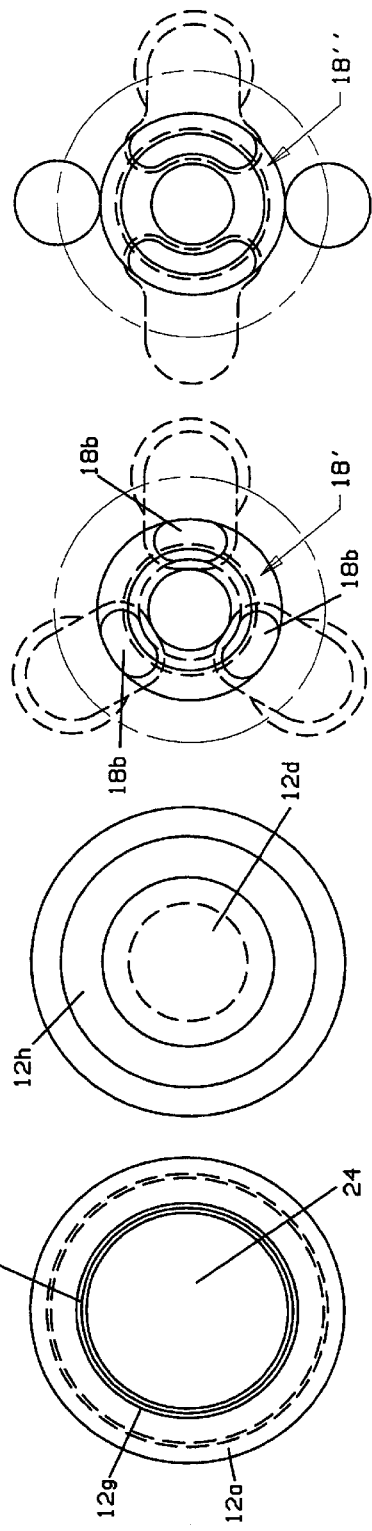

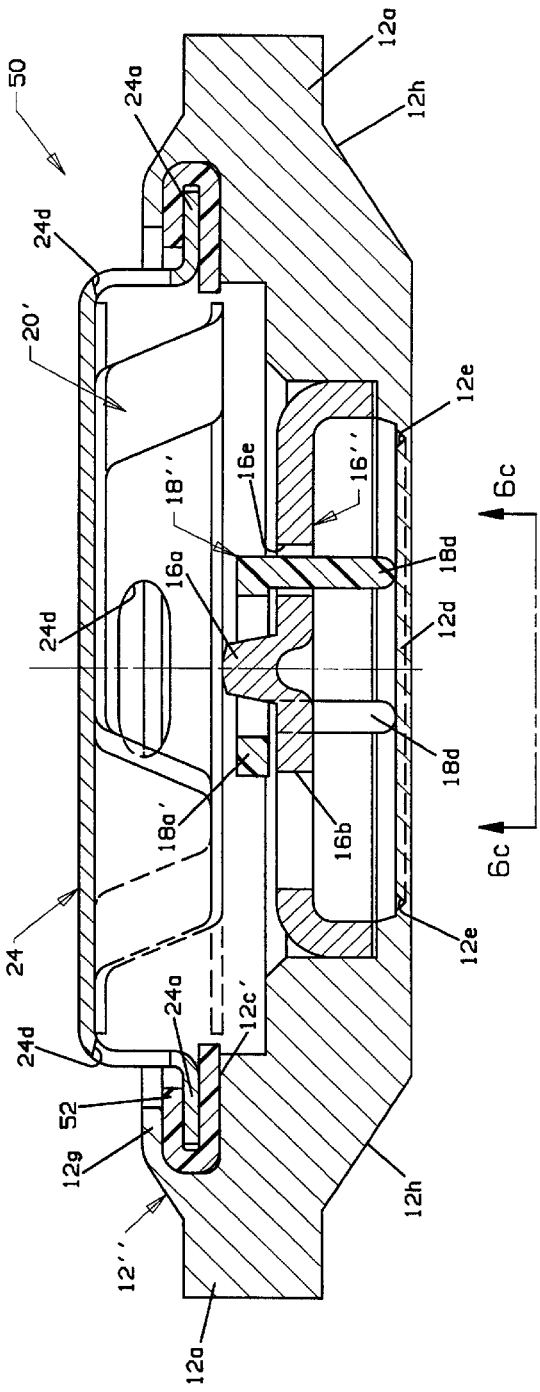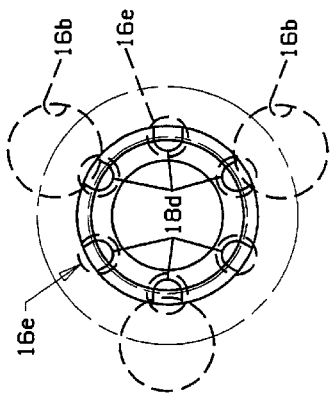
FIG 6c
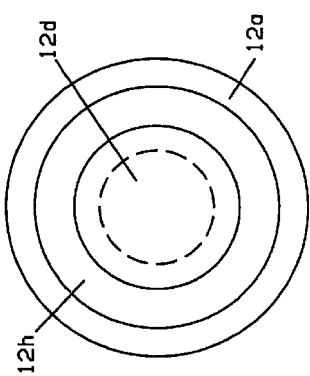
FIG 6b
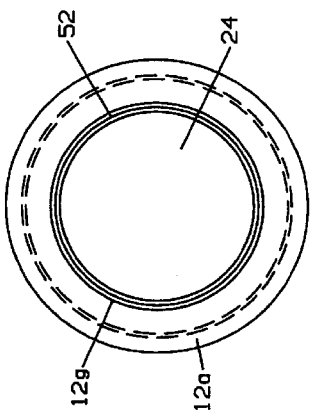
FIG 6a

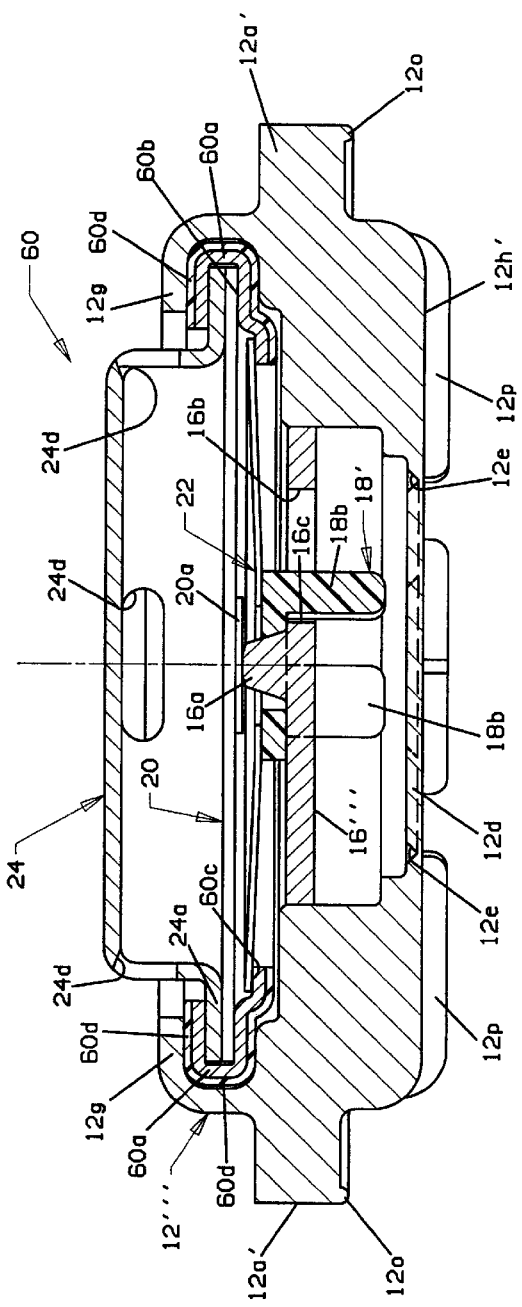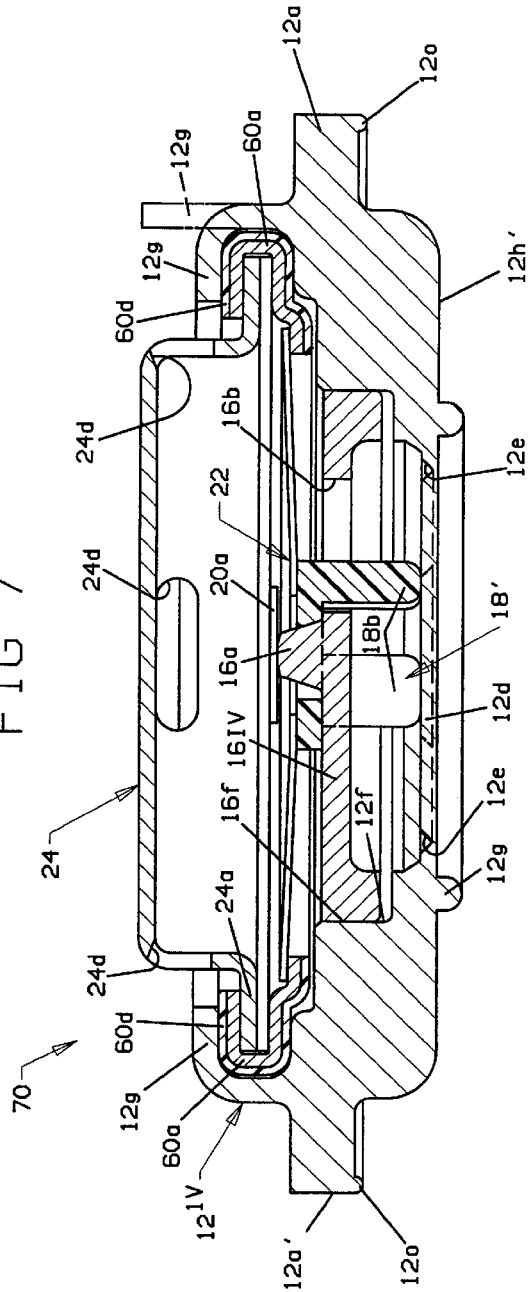

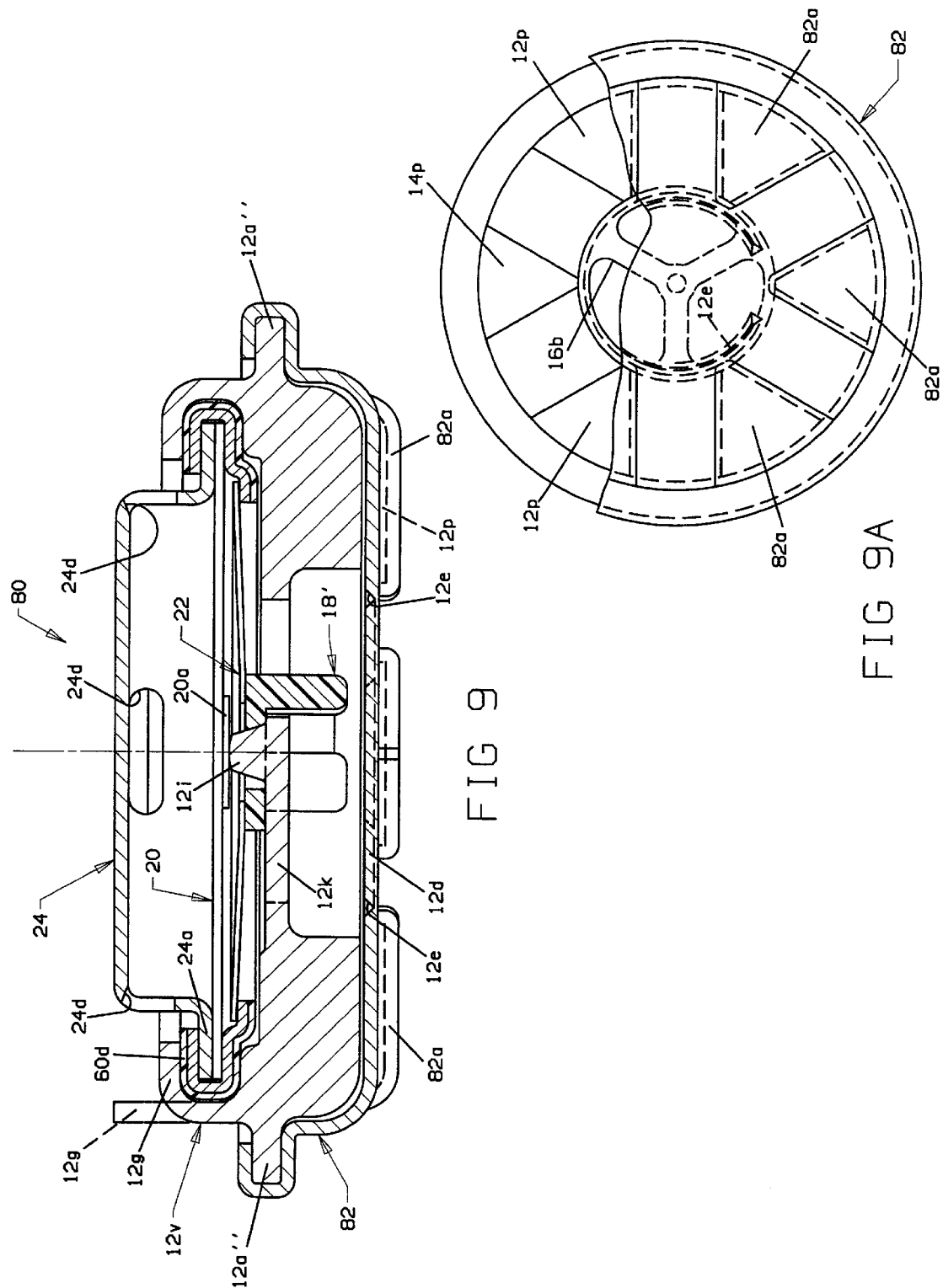

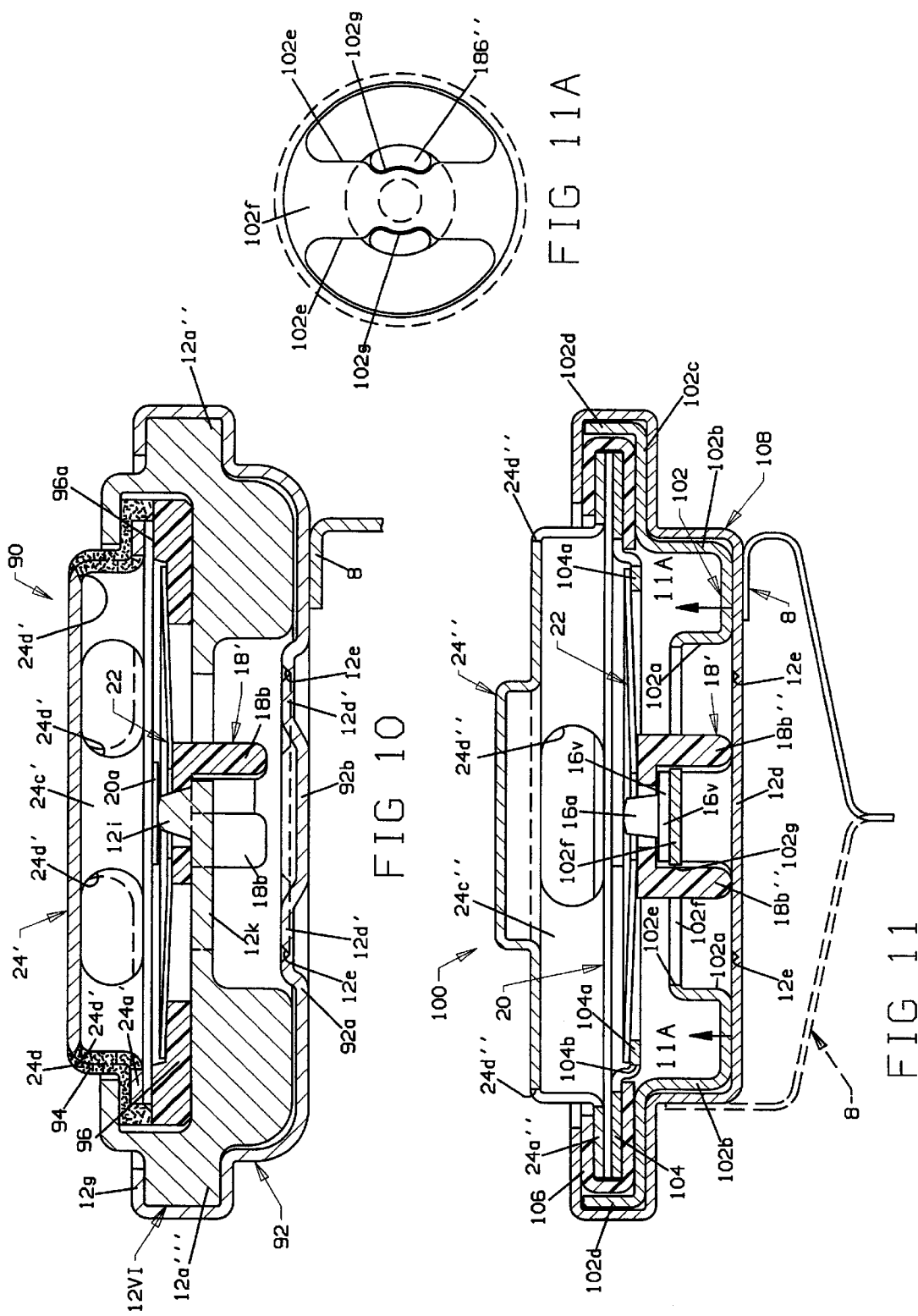

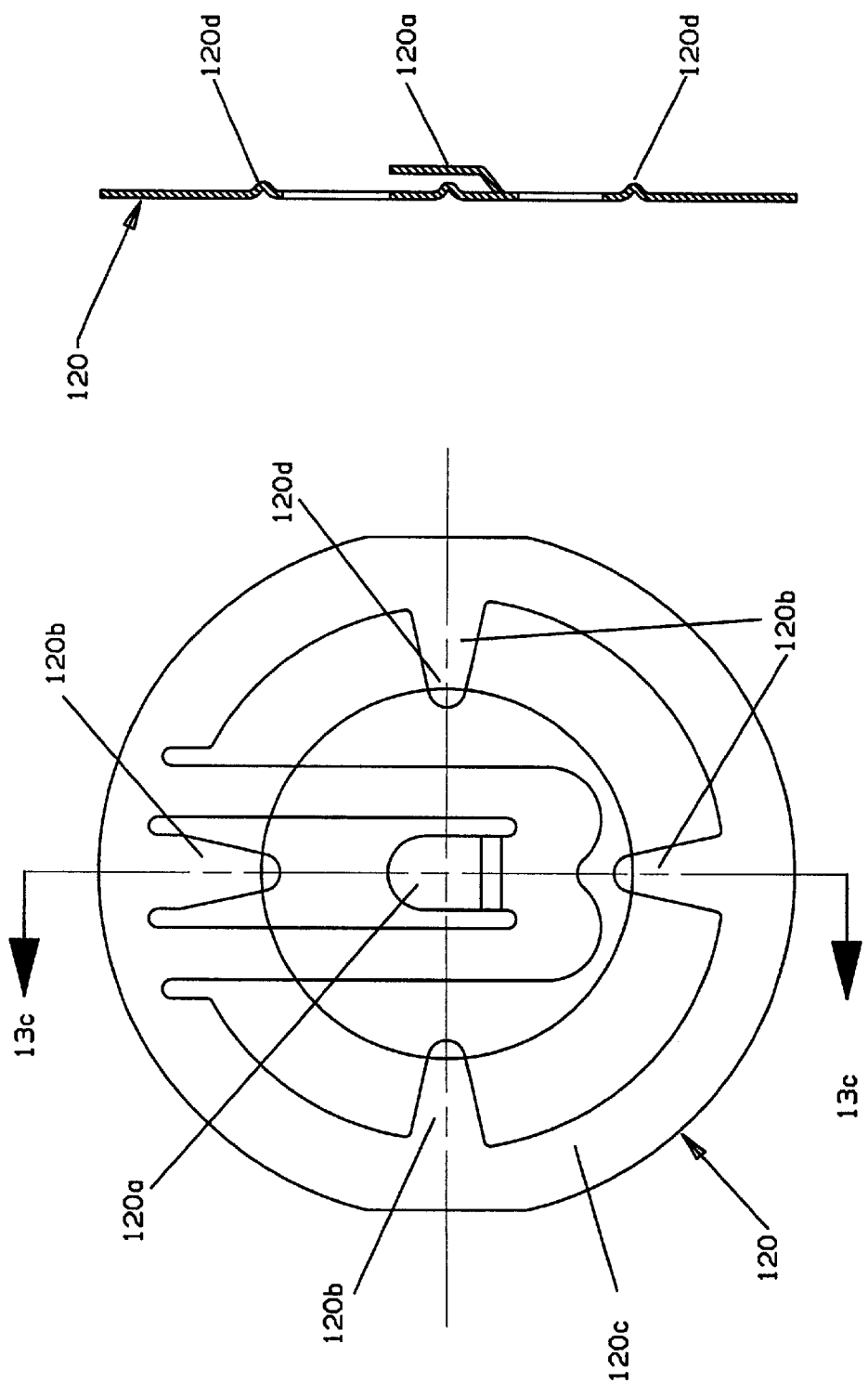

CURRENT INTERRUPT APPARATUS FOR ELECTROCHEMICAL CELLS

This application claims the benefit of U.S. Provisional Application No. 60/071,557, filed Jan. 15, 1998.

FIELD OF THE INVENTION

This invention relates generally to electrochemical cells and more particularly to current interrupt and vent apparatus used for such cells responsive to various adverse conditions.

BACKGROUND OF THE INVENTION

Electrochemical cells, especially high energy density cells such as those in which lithium is an active material, are subject to leakage or rupture by various abusive treatment, which, in turn, can cause damage to the device which is powered by the cell or to the surrounding environment. In the case of rechargeable cells self-heating occurs as such cells are charged. Charging at too rapid a rate or overcharging can lead to an excessive increase in temperature. When the temperature exceeds a certain point, which varies depending upon the chemistry and structure of the cell, an undesirable and uncontrollable thermal runaway condition begins. In addition, because of the overheating and/or chemical reaction, internal pressure builds up, and electrolyte may suddenly be expelled from the cell.

Conventional cell designs employ an end cap fitting which is inserted into an open ended cylindrical casing after the cell's active material, appropriate separator material and electrolyte have been inserted therein. The end cap is in electrical contact with one of the anode or cathode material and the exposed portion of the cap forms one of the cell terminals. A portion of the cell casing forms the other terminal. Typically, various loose components are received in the end cap to provide over-pressure, short circuit and/or over-temperature protection. The typical header includes one or more seals to prevent leakage of the electrolyte through the header. However, these seals tend to leak over time due to temperature and pressure conditions and the like. Conventional cells frequently employ polymer PTC (positive temperature coefficient of resistivity) components for over-current protection which are susceptible to deformation when the header is crimp sealed to the electrochemical cell during manufacture. Deformation of the PTC component adversely effects its performance. Further, polymer PTC inherently results in relatively low ampere capacity and high resistance.

Copending U.S. Pat. No. (Ser. No. 08/720,585- A40743), which is incorporated herein by this reference, shows a current interrupt device responsive to over-temperature and over-pressure conditions which is incorporated into an end cap assembly which, in turn, is welded into the open end of the casing of an electrochemical cell to form a hermetic seal. This end cap assembly has particular application to rechargeable (secondary) cells, such as lithium-ion, nickel metal hydride, nickel cadmium and the like, to overcome the danger of the cell over-heating and pressure building up in the cell during exposure to high temperatures, excessive or improper charging, or shorting of the cell. While the current interrupt device of the patent is very effective, it would be desirable to provide an end cap assembly which has fewer component parts and which can be crimped into the casing of the electrochemical cell to lower the cost of the device while forming an effective hermetic seal. Additionally, it would be desirable to integrate an additional safety feature relating to low rate overcharge and overdischarge protection.

SUMMARY OF THE INVENTION

It is an object of the present invention to provide end cap apparatus for an electrochemical cell which includes improved safety features which is an assembled unit to which an electrode tab or strap can be easily welded to effect electrical connection and, as a single calibrated unit, can be deposited in the open end of a cell casing and crimped thereto in hermetically sealed relation to the casing without the danger of upsetting or changing the preset calibration of the safety features. Another object of the invention is the provision of end cap apparatus for such a cell incorporating a thermally responsive member adapted to interrupt current flow in response to over-temperature due to heat received through a heat transfer path from the interior of the cell to the thermally responsive member as well as heat generated by $I^2r$ heating of components within the end cap apparatus. Yet another object is the provision of end cap apparatus for such a cell having a pressure responsive diaphragm disposed in pressure receiving communication with the atmosphere inside the cell in which welding of the cell's electrode tab to the end cap apparatus is facilitated. Yet another object is the provision of end cap apparatus which has improved electrolyte leak protection as well as providing venting in response to selected over-pressure conditions. Another object is the provision of electrochemical cell end cap apparatus which is easily handled and installed and which is small in size and mass. Yet another object of the invention is to provide an end cap apparatus which has increased ampere capacity over a broad ambient temperature range, e.g., −20° to 80° C., to serve high power applications and allow fast charging utilizing higher energy density cell chemistries.

Briefly, in accordance with the invention, end cap apparatus for electrochemical cells particularly useful with lithium-ion cell chemistry, comprises a header which allows the cell manufacturer to attach the end cap apparatus utilizing existing crimp technology to produce an electrolyte seal with the header also serving as a vehicle to mount several condition sensing mechanisms for a single action, safety protection device. End cap apparatus made in accordance with the invention provides the capability of opening the electrical charging circuit across a broad range of incremental cell pressure, without venting, as well as venting upon a high predetermined pressure level. The safety protection features include high rate overcharge protection (over-temperature and/or low pressure switch), low rate overcharge/overdischarge protection (low pressure switch), extended short circuit protection (thermally sensitive switch) and explosion protection (high pressure vent). The apparatus can be modified to include all or selective ones of the safety protective features, as desired.

The end cap apparatus in the preferred embodiments is of positive polarity and is electrically isolated from the negative polarity of the cell's casing by means of a polymer gasket which is compressed between the inside diameter of the cell casing and the outside diameter of the end cap apparatus. An electrical strap, typically aluminum, from the cell plates is welded to a portion of the bottom surface of the header forming the positive current path. The header is formed with a rigid, circumferential flange extending about the periphery thereof which allows the end cap apparatus to be crimped to the cell as well as cell pressurization to occur, both without changing the calibration of the safety protection features. In selected embodiments, the header is suitably formed of aluminum by machining, forging or the like to form a centrally disposed recess with a thin diaphragm portion, e.g., 0.008 inches thick extending across the recess, the diaphragm having a frangible portion which ruptures at a predetermined pressure level to prevent cell explosion. Suitable vent holes are formed through the header and ancillary components to allow the pressurized fluid, i.e., electrolyte, to escape upon venting. In certain other embodiments a diaphragm cap member, typically aluminum, is attached to the circumferential flange and extends over the lower half of the header, i.e., over the portion which will be exposed to electrolyte in the cell forming a leak proof seal. A corresponding diaphragm portion and frangible portion is formed in the diaphragm cup member.

According to a feature of the invention, a motion transfer member of electrically insulative material is movably mounted in the recess and is adapted to transfer motion from the diaphragm portion to a movable contact normally biased into engagement with a stationary contact portion to force the movable contact out of electrical engagement with the stationary contact portion upon a selected increase in pressure within the cell. The movable contact is part of an electrically conductive spring member which is mounted in the recess formed in the header and electrically separated therefrom, in certain embodiments, by an annular insulative member. A top cap is mounted on an annular insulative member and is clamped to the header by means of a lip of the header which is rolled over with a portion of the annular insulative member disposed therebetween to electrically separate the header from the top cap. A thermally responsive, snap acting disc having a centrally located aperture is also mounted on the annular insulative member and is adapted to move from a first dished configuration in which a stationary contact is received through the aperture in the disc and the movable contact is biased into engagement with the stationary contact, to a second, oppositely dished configuration upon being heated to predetermined temperature to thereby drive the movable contact out of electrical engagement with the stationary contact. The disc is selected, in the preferred embodiments, to have such a low reset temperature, e.g., −20° C., that it becomes, in effect, a non-resettable safety device.

According to a feature of certain embodiments of the invention, the header is provided with a solid portion having substantial thickness at a location intermediate to the diaphragm and the circumferential flange which facilitates the welding operation of the electrode tab of the aluminum strap lo the header.

The header, formed of highly heat conductive aluminum, also serves as an effective heat conductive path from the interior of the cell to the thermally responsive disc thereby allowing a disc with a relatively high actuation temperature, that is, a disc having a minimized delta temperature between the disc actuation temperature and the temperature of the cell's core used as the reference for actuation of the thermal protection feature. The higher actuation temperature of the disc results in minimizing the possibility of a nuisance trip of the cell.

One embodiment is shown which includes only pressure protective features. Certain embodiments use an annular disc and spring mounting member comprising a high modulus material, e.g., metal, laminated with a low modulus electrically insulative plastic to provide a predictable seating surface as well as optimized clamping by the rolled lip of the header.

According to another feature of certain embodiments of the invention, protrusions are formed about the frangible portion of the diaphragm which protect that portion from damage during handling. The protrusions can be in the form of a continuous rib or they can be slotted, as by extending radially, in effect forming slots to permit radial venting in the event that the cell's plates are forced into blocking engagement with the bottom of the end cap apparatus.

According to another feature of the invention, a small circumferential bead can be formed on the flange to provide localized, high compression for clamping the annular insulative member and its components to the header.

According to yet another feature of the invention, the diaphragm portion can be formed with a dish shape to provide instantaneous displacement of the diaphragm at a selected pressure level. This feature can also be provided by locating the frangible portion of the diaphragm inboard of a support or strengthened area. Several diaphragm cap members are provided having improved snap action diaphragm portions which include an inclined, either straight or curved surface or truncated conical portion which serves as a calibration surface to compensate for differences in material properties and thicknesses as well as to enhance the driving force upon snapping of the diaphragm portion. Welding of the electrochemical cell's rolled cathode or anode electrode tab can be enhanced by providing a flat to convex surface either by a separate cup member or by an offset portion formed in the diaphragm portion.

According to another feature of the invention, the annular insulative member is formed of a first annular electrical portion of relatively high modulus to serve as a seating surface and a second electrically insulative portion of relatively low modulus, low strength which is insert molded on the top cap and which extends over the vent holes in the top cap. The second portion serves as an optimized clamping medium as well as a seal of the vent holes to permit rinsing of the cell after assembly without interfering with the venting function, i.e., the material covering the vent holes will yield at pressure levels well below venting pressure allowing the pressurized electrolyte to escape. In yet another embodiment the annular insulative member combines additional functions of seating the thermally responsive disc as well as providing motion transfer between the diaphragm portion and the movable contact.

According to still other features, stamped parts can be utilized in making the end cap apparatus while still providing the same functional operation of the safety features as well as the feature of avoiding calibration changes upon crimping and pressurization of the cell.

BRIEF DESCRIPTION OF THE DRAWINGS

The accompanying drawings, which are incorporated in and constitute a part of the specification, illustrate preferred embodiments of the invention and, together with the description, serve to explain the objects, advantages and principle of the invention. Dimensions may have been altered for purposes of illustration. Corresponding reference numerals refer to like parts throughout the views of the drawings.

In the drawings:

FIGS. 4-11, 14 and 17 are views similar to FIG. 3 of end cap apparatus made in accordance with alternate embodiments of the invention;

FIGS. 4a and 4b are top and bottom views, respectively, of the FIG. 4 apparatus;

FIGS. 5a and 5b are top and bottom views, respectively, of the FIG. 5 apparatus;

FIG. 5c is a view taken on line 5c—5c of FIG. 5, with the diaphragm removed for purposes of illustration, showing a motion transfer member having three legs;

FIG. 5d is a view similar to FIG. 5c showing a motion transfer member having two legs;

FIGS. 6a and 6b are top and bottom views, respectively, of the FIG. 6 apparatus;

FIG. 6c is a view taken on line 6c—6c of FIG. 6 with the diaphragm removed for purposes of illustration, showing a motion transfer member having a plurality of legs;

FIG. 9a is a bottom view of the FIG. 9 apparatus shown with a diaphragm cup member partly removed for purposes of illustration;

FIG. 11a is a view taken on line 11a—11a of FIG. 11, shown with the diaphragm removed for purposes of illustration;

FIG. 13b is a top plan view of a spring member used in the FIG. 13 embodiment and FIG. 13c is a cross section taken on line 13c—13c of FIG. 13b;

FIG. 17a is a top plan view of the annular electrically insulative member used in FIG. 17 with FIG. 17b being a cross section taken on line 17b—17b of FIG. 17a.

DETAILED DESCRIPTION OF PREFERRED EMBODIMENTS

Figures 1, 2:
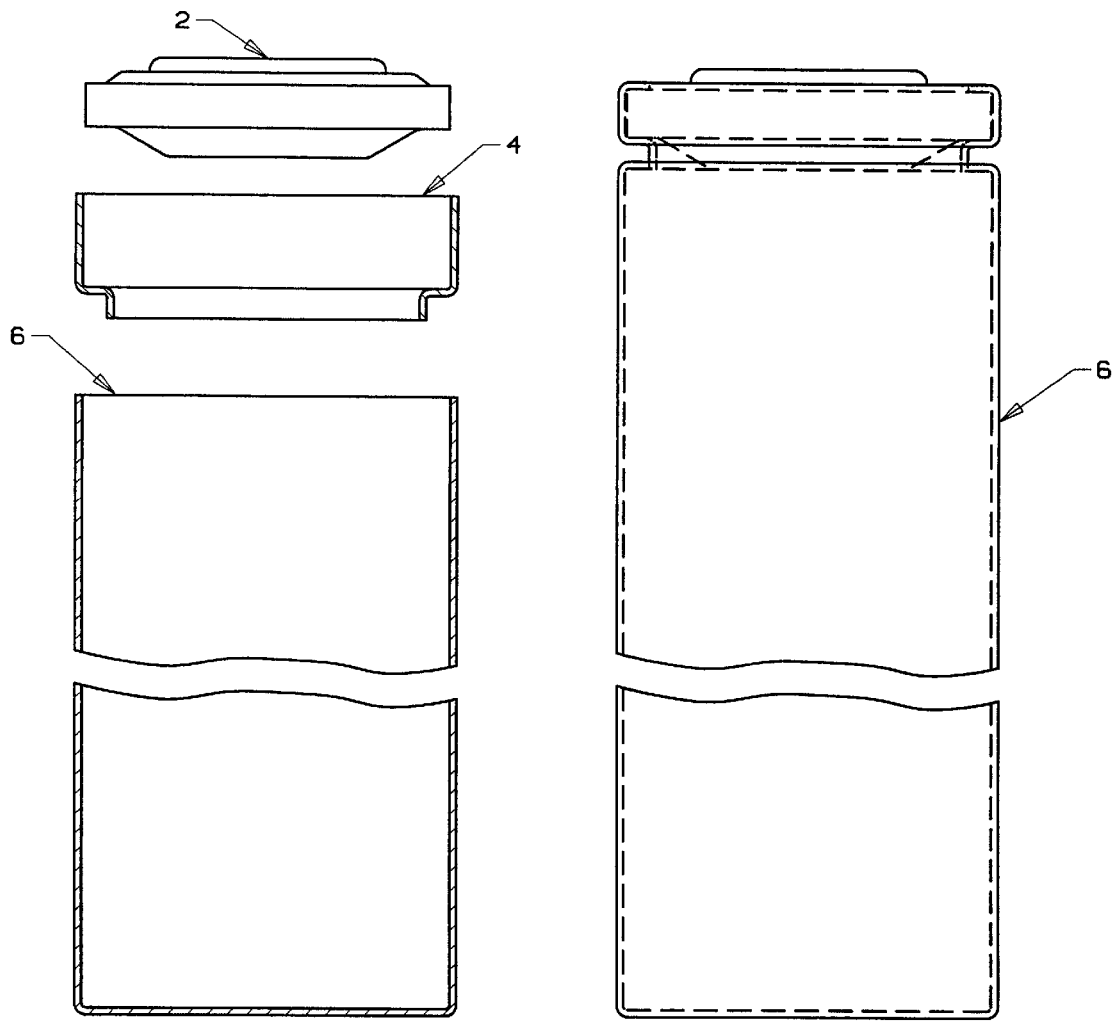
FIG. 1 is an exploded front elevational view of a casing of an electrochemical cell, a gasket and a schematic representation of an end cap apparatus prior to assembly shown with the cell and gasket in cross section.
FIG. 2 is a front elevational view showing the FIG. 1 end cap apparatus and gasket assembled in the cell.

FIG. 1 shows an end cap apparatus 2 made in accordance with the invention, along with a gasket 4 of electrically insulative material, and an open ended cylindrical casing 6, prior to assembly, while FIG. 2 shows the gasket and end cap apparatus after it has been received in the open end of casing 6 and sealingly crimped thereto. End cap apparatus 2 can be comprised of any one of several embodiments discussed below.

Figure 3:
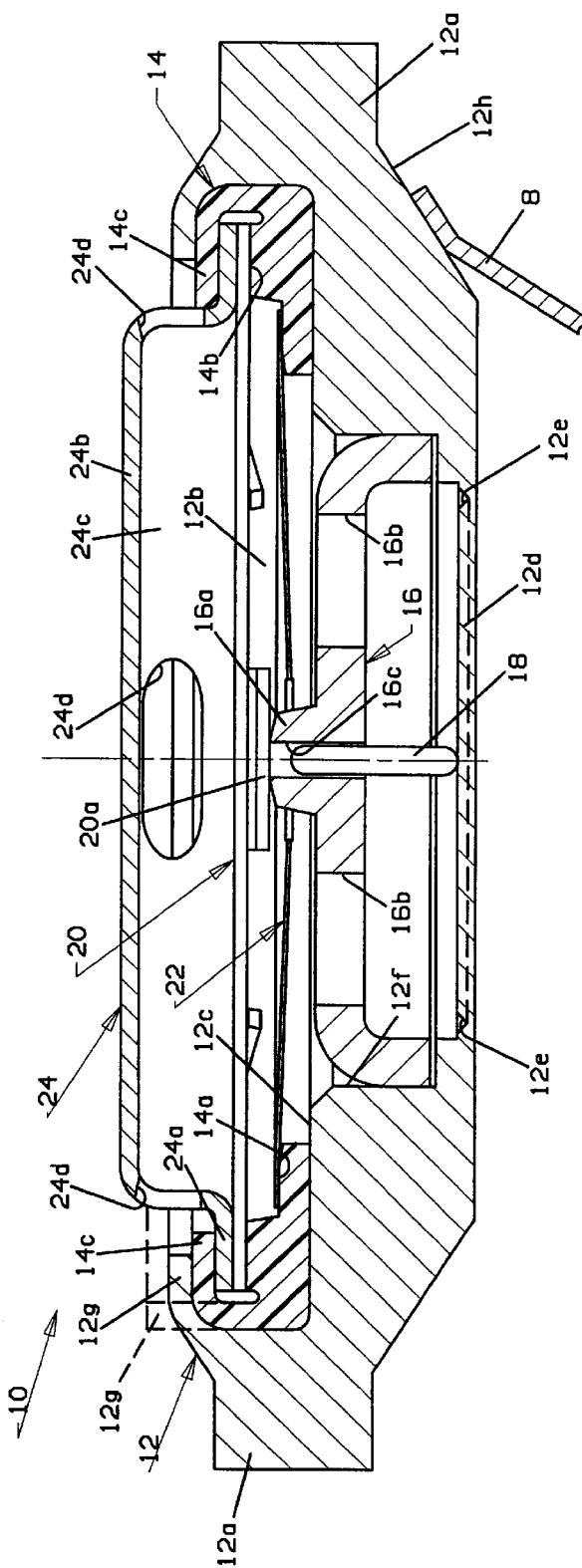
FIG. 3 is an elevational view, in cross section, of an end cap apparatus made in accordance with a first embodiment of the invention.
Figure 3B:
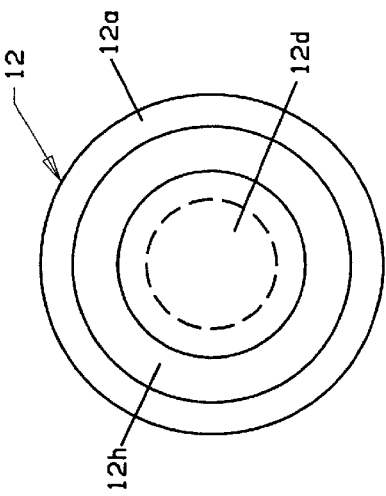
FIGS. 3a and 3b are top and bottom views, respectively, of the FIG. 3 apparatus.
Figure 3A:
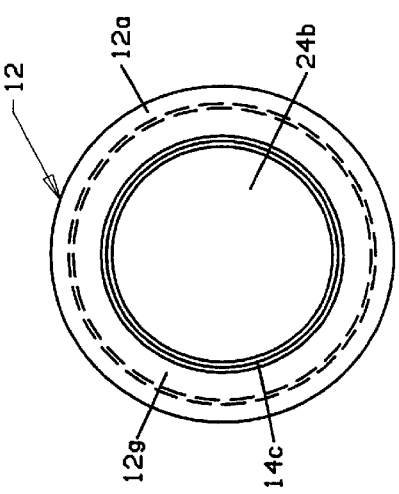

With reference to FIGS. 3, 3a and 3b, an end cap apparatus made in accordance with a first embodiment of the invention is identified by reference numeral 10 and comprises a generally circular, in top plan view, header 12 formed of suitable material by machining, forging or the like. When used with electrochemical cells which comprise lithium as an active material, aluminum, which is compatible with the electrolyte in such cells, serves as a suitable material in cells in which the core is of positive polarity and the casing of negative polarity. Header 12 is formed with a rigid, circumferentially extending flange 12a and a recess 12b to serve as a switch chamber. A platform 12c formed on header 12 receives an annular, electrically insulative member 14, to be discussed. A thin preferably circular diaphragm 12d, e.g., 0.008 inches in thickness, is centrally formed in the bottom of header 12 and is formed with a frangible portion 12e formed as by coining, of a selected configuration, such as C-shaped as disclosed in U.S. Pat. No. (A40743), reference supra, as well as in FIG. 9a.

A generally disc shaped stationary contact plate 16 having an upstanding contact portion 16a is formed of suitably electrically conductive material, such as cold-rolled steel with a gold or silver plated contact face which is press fit into a cylindrical portion 12f of recess 12b. Stationary contact plate 16 is provided with one or more apertures 16b which serve to allow electrolyte to pass through in the event that the frangible portion of diaphragm 12d bursts due to an undesirable, selected increase in pressure. Contact member 16 is also provided with a bore 16c which extends through contact member 16 at the center thereof aligned with the center of diaphragm 12d. A motion transfer pin 18 of electrically insulative material, such as ceramic or plastic, is slidingly received in bore 16c. The length of pin 18 is selected to enable it to transfer motion from diaphragm 12d to a movable contact portion 20a to be discussed.

Electrically insulative annular member 14 is formed with a first thermally responsive disc seat 14a and second electrically conductive spring and top cap seat 14b spaced vertically above and outboard of seat 14a, as seen in FIG. 3. Insulative member 14 may be composed of plastic material having a relatively high modulus to provide a predictable seat for disc 22 and at the same time sufficiently flexible to allow it to conform to the rolling over of lip 12g to be discussed. A thermostat metal (e.g. bimetal), snap acting disc 22, movable from a first dished shaped configuration shown in FIG. 3 to a second, opposite dished shaped configuration (not shown) when heated to a predetermined temperature, is disposed on disc seat 14a. Disc 22 is selected to have a very low reset temperature, e.g., approximately −20° C., so that, in effect, it becomes a single action or non-resettable device. Disc 22 is formed with an aperture through the disc at its center with stationary contact portion 16a extending up through the aperture when the disc is in the first configuration. Spring member 20, formed of suitable electrically conductive material, such as beryllium copper, is received on spring and top cap seat 14b and has a contact tab 20a with a gold or silver plate or stripe on the contact tab aligned with and normally biased into engagement with stationary contact portion 16a. A top cap 24 formed of electrically conductive material such as a plated cold rolled steel has a circumferential flange 24a electrically connected to spring member 20 as by physical contact or by welding. Top cap 24 has a top wall 24b and a sidewall 24c through which one or more vent holes 24d are formed to allow pressurized electrolyte to escape in the event that frangible portion 12e of diaphragm 12d is broken due to over-pressure conditions.

Header 12 has a upstanding circumferential lip 12g which cooperates with an upstanding skirt 14c of annular insulative member 14 to clamp top cap 24 and spring member 20 on seat 14b when lip 12g is deformed or rolled from the dashed line to the solid line configuration with top cap 24 and spring member 20 electrically separated from header 12.

The bottom portion of header 12, as seen in FIG. 3, which serves as the inside surface of the end cap apparatus exposed to the electrolyte in casing 6, is formed with a solid portion 12h which extends intermediate to diaphragm 12d and flange 12a which not only adds rigidity to the header which, along with the rigidity of flange 12a, prevents any bowing of the header body when the header is crimped into casing 6 or when the cell is pressurized, also advantageously serves as an excellent support for welding electrode tab 8 to the header, as by laser or ultra sonic welding, both of which require a pressurized engagement of the components being welded during the welding operation.

Header 12 serves as a receptacle for the several parts of the end cap apparatus and its rigidity allows the end cap apparatus to be manufactured and assembled having a selected calibration for the several protective functions which is not susceptible to shifts in calibration during crimping of the apparatus to the casing nor during pressurization of the cell. Electrode tab 8 can be welded to surface 12h of the header and the apparatus placed in the open end of casing 6 in gasket 4 and crimped thereto to form a hermetic seal without any danger of changing the calibration of the protection functions.

The safety or protective functions comprise temperature protection, pressure protection and short circuit protection by separating movable contact tab 20a from stationary contact portion 16a to interrupt current flow which normally extends through electrode tab 8 through header 12, stationary contact plate 16, spring 20 to top cap 24. The temperature protection function utilizes bimetal disc 22 which is selected to snap from the configuration shown in FIG. 3 to an opposite dished configuration (not shown) forcing movable contact tab 20a to move out of electrical engagement with stationary contact portion 16a. Header 12, formed of aluminum, serves as a highly heat conductive path from tab 8 to disc 22 resulting in an optimized low delta temperature between the core of the cell and disc 22. This permits a higher actuation temperature of the disc 22 while still using the same core temperature as the reference temperature. The result of this is that the cell can be subjected to higher ambient temperature environments without nuisance actuation of the temperature protection function.

Short circuit protection is afforded by means of $I^2r$ heating of top cap 24, spring 20, contact interface between tab 20a and contact portion 16a and contact plate 16 with the heat being transferred to disc 22 resulting in actuation of disc 22.

Pressure increase within the cell will cause diaphragm 12d to bow inwardly. This bowing causes pin 18 to move toward movable contact tab 20a eventually lifting the tab off stationary contact portion 16a to interrupt current flow. This type of pressure increase can occur without a corresponding increase in temperature in certain situations such as upon low current overcharge or overdischarge. The amount of bowing as well as the pressure at which the bowing occurs can be controlled by the thickness of the diaphragm portion 12d as well as its hardness. Additional control is obtained by varying the length of pin 18. As described, the protection function is characterized by a creep action mode of operation; however, as will be described below, this can be made into a snap action mode of operation, if desired.

In the event that pressure increases above a selected level, the frangible portion 12e will break allowing pressurized electrolyte to escape through apertures 16b in stationary contact 16 and 24d in top cap 24.

FIGS. 4, 4a and 4b show a modification of the FIG. 3 embodiment in which diaphragm 32 of end cap apparatus 30 is formed as a separate member and is hermetically attached to header 12' as by laser welding. As shown in FIG. 4, a downwardly extending flange 32a is welded all around its circular periphery to a corresponding flange 12j. In this embodiment, stationary contact portion 12i, corresponding to 16a of FIG. 3, is formed integrally with header 12' in a transversely extending wall portion 12k of header 12'. A bore 12m corresponding to bore 16c of FIG. 3, slidingly receives motion transfer pin member 18 and apertures 12n through wall portion 12k serve as vent apertures corresponding to aperture 16b of FIG. 3. The operation of end cap apparatus 30 is the same as that of the FIG. 3 embodiment.

FIGS. 5 and 5a–5c show another modification of the FIG. 3 embodiment. End cap apparatus 40 comprises the same header 12, top cap 24, spring 20, disc 22 and annular insulative member 14; however, stationary contact plate 16' has been modified to accommodate a multi-leg motion transfer member 18'. Motion transfer member 18', composed of suitable electrically insulative material such as ceramic or plastic, comprises a body portion 18a with three depending legs 18b which are slidingly received through aperture 16c. FIG. 5d shows a modified motion transfer member 18" with two legs which can be used, if desired, with a stationary contact plate modified to include accommodating apertures.

FIGS. 6 and 6a–6c show another modification of the FIG. 3 embodiment. End cap apparatus 50 comprises header 12" the same as in the FIG. 3 embodiment except that platform 12c of FIG. 3 has been modified to include a step portion 12c' to receive flange 24a of top cap 24 by itself with an annular gasket 52 of electrically insulative material to electrically isolate top cap 24 from header 12". Lip 12g is rolled over in the same manner as in the previous embodiments. Electrically conductive spring 20' is, in effect, suspended from and electrically connected to top cap 24 as by welding and is biased into electrical engagement with stationary contact portion 16a. Stationary contact plate 16" has a plurality of bores 16e which slidingly receive therethrough respective legs 18d which extend from body 18a' of motion transfer member 18'". This embodiment includes the pressure protection features of the above embodiments but does not include temperature protection and short circuit features.

FIG. 7 shows another modification of the FIG. 3 embodiment. End cap apparatus 60 comprises a header 12'" in which flange 24a of top cap 24 and spring 20 are received on seat 60b of an annular metal member 60a of suitable high modulus material such as aluminum, nickel, stainless steel or the like providing a predictable disc seat 60c for thermally responsive, snap acting disc 22. Member 60a is laminated with an electrically insulative material 60d such as thermoplastic preferably having a relatively low modulus to serve both to electrically separate spring 20 and top cap 24 from header 12'" and to provide an improved clamping engagement of lip 12g. Flange 12a' is formed with a bead 12o which serves as a localized high compression feature to enhance the crimping seal of casing 6 through gasket 4. Although bead 12o is shown at the outer distal end of flange 12a', it will be understood that the bead could be placed at other locations of flange 12a' to provide the improved localized high compression function. Yet another feature incorporated in header 12'" comprises radially extending protrusions 12p formed in the bottom surface of the header, as seen in FIG. 7, outboard of diaphragm portion 12d. The protrusions serve to provide protection for frangible portion 12*e* of the diaphragm during handling of the end cap apparatus prior to being crimped into casing 6 thereby preventing a potential leakage path allowing electrolyte through a damaged portion of the frangible portion. As shown in FIG. 7, the protrusions are spaced from one another to allow a radial venting path from the interior of casing 6 up through the diaphragm area in the event that increased pressure causes the diaphragm to rupture even if the cell plates are biased against the bottom of header 12'''. Stationary plate 16''' is shown as a generally flat plate having an upwardly extending stationary contact portion 16*a* with venting apertures 16*b* and leg receiving apertures 16*c* for sliding reception of legs 18*b* of motion transfer member 18' as shown in the FIG. 5 embodiment.

End cap apparatus 70 of FIG. 8 is similar to the FIG. 7 embodiment except that protrusion 12*q* forms a circular, continuous protection surface slightly outboard of frangible portion 12*e* and stationary plate 16$^{iv}$ is formed with a slightly greater bearing surface 16*f* for press fitting in bore 12*f*. Surface 12*h'* in both the FIGS. 7 and 8 embodiments is used to weld electrode strap 8 (not shown) upon assembly when mounted in casing 6.

FIGS. 9 and 9*a* show another embodiment in which a separate diaphragm cap 82, formed of suitable material such as aluminum, is attached to flange 12*a''* of apparatus 80, as by welding, press fitting or crimping thereto, and extends over the bottom half of header 12$^v$. Radially extending protrusions 12*p* of the type shown in FIG. 7 are formed in the lower surface of header 12$^v$ with corresponding protrusions 82*a* formed in diaphragm cap 82. Header 12$^v$ is formed similar to that of FIG. 4 having an open bottom and an integral transverse wall 12*k* which serves to mount stationary contact portion 12*i*. Since header 12$^v$ is shielded from the electrolyte of the electrochemical cell by diaphragm cap 82, it can be formed of any suitable material, such as a higher strength cold rolled steel, if desired. Diaphragm portion 12*d* is formed as part of diaphragm cap 82 and covers the open bottom portion of header 12$^v$. Frangible portion 12*e* is shown in FIG. 9*a* formed in a C-shaped configuration as seen in the bottom plan view. Although other configurations could be utilized, the C-shaped configuration is a preferred configuration.

FIG. 10 shows another embodiment similar to that of FIG. 9 in having a separate diaphragm cap 92 formed of suitable material such as aluminum. Diaphragm portion 12*d'* in the FIG. 10 embodiment is recessed at 92*a* so that the bottom portion of header 12$^{vi}$ provides the protective feature for frangible portion 12*e*. Diaphragm portion 12*d'* is shown formed with a dish shaped portion 92*b*. Upon exposure to increasing pressure from within the cell, dish shaped portion 92*b* will snap to an oppositely dished configuration (not shown) to drive motion transfer member 18' upwardly, as seen in the figure, to move movable contact portion 20*a*, through disc 22, away from stationary contact portion 12*i*. Continued pressure increase, should it occur, as in the other embodiments, will cause frangible portion 12*e* to break allowing the pressurized electrolyte to vent. Header 12$^{vi}$ is formed of material such as aluminum in the FIG. 10 embodiment to provide a low weight end cap apparatus 90 and therefore peripheral flange 12*a'''* is made somewhat thicker than in the FIG. 9 embodiment to provide the desired degree of rigidity, as discussed above. Top cap 24', formed of plated cold rolled steel, is formed with a radially extending flange 24*a'* which is welded to electrically conductive spring 20, and has a plurality of vent apertures 24*d'* formed in sidewall 24*c'*. Top cap 24' is overmolded with electrically insulative material 94 having a low modulus and low strength, such as unfilled polypropylene, which serves as a low pressure seal for vent holes 24*d'*, electrical separator between top cap 24', spring 20 and header 12$^{vi}$ and an improved clamping connection with lip 12*g* once it is rolled over as shown in the figure. The top cap assembly, i.e., the overmolded cap 24' and spring 20, is received on annular insulative member 96 formed of high modulus material, such as a mineral or glass filled thermoplastic, to provide a stable seat for the top cap assembly at 96*a* as well as disc 22 at 96*b*. By having vent holes 24*d'* covered with overmold material 94, the assembled electrochemical cell can be rinsed of any electrolyte which may have been inadvertently deposited on the exterior, non-aluminum surface of casing 6 and end cap apparatus 90 thereby preventing corrosion of the internal components. In operation, should the pressure level in the cell increase to the point where frangible portion 12*e* breaks, the escaping pressurized fluid will easily break the seal of the low strength material 94 covering vent apertures 24*d'*.

FIGS. 11 and 11*a* show yet another embodiment in which end cap apparatus 100 is formed out of stamped parts to provide the functional equivalent of the previously described embodiments. Support member 102, formed of high modulus, strong material such as nickel, cold rolled steel or stainless steel has upstanding sidewalls 102*a*, 102*b* to enhance rigidity and an outwardly extending flange portion 102*c*. The outer portion 102*d* of flange 102*c* extends upwardly to provide added strength and rigidity to the composite flange to be described. Vent apertures 102*e* are formed in recessed wall portion 102*f*. Motion transfer leg apertures 102*g* are formed in wall portion 102*f* to slidingly receive respective legs 18*b''* of a two leg motion transfer member 18''. An annular disc seat member 104 formed of high strength, high modulus material such as nickel, cold rolled steel, stainless steel or the like is received on flange portion 102*c* and is formed with a disc seat 104*a* for receipt of disc 22. Ventilation holes 104*b* are formed in disc seat 104 to facilitate electrolyte venting. Electrically conductive spring 20 is received on top of disc seat member 104 along with flange 24*a''* of top cap 24''. A suitable electrically insulative gasket 106, such as Nomex, or thermoplastic, is placed around the stack of flange 24*a'''*, the outer peripheral portion of spring 20 and annular disc seat member 104 to electrically separate the stack from support members 102 and diaphragm cap member 108 received over support 102. Top cap 24'' formed of suitable material such as nickel, stainless steel, cold rolled steel or the like is formed with suitable vent apertures 24*d''* in sidewall 24*c''*. Diaphragm cap member 108 is formed with a diaphragm portion 12*d* and frangible portion 12*e* as in the above described embodiments. Stationary contact 16*a*, integral with stationary contact plate 16$^v$, is welded to wall 102*f* of support 102. The composite flange is made up of flange 24*a'''*, the outer periphery of spring 20, annular disc seat member 104, flange support 102*c*, the diaphragm cap member 108 and gasket 106. The horizontal and vertical portions of diaphragm cap member 108, and the horizontal and vertical portions of support member 102 are high modulus, high strength materials to provide a rigid composite flange structurally equivalent to the header flanges of the previously described embodiments.

Figure 12:
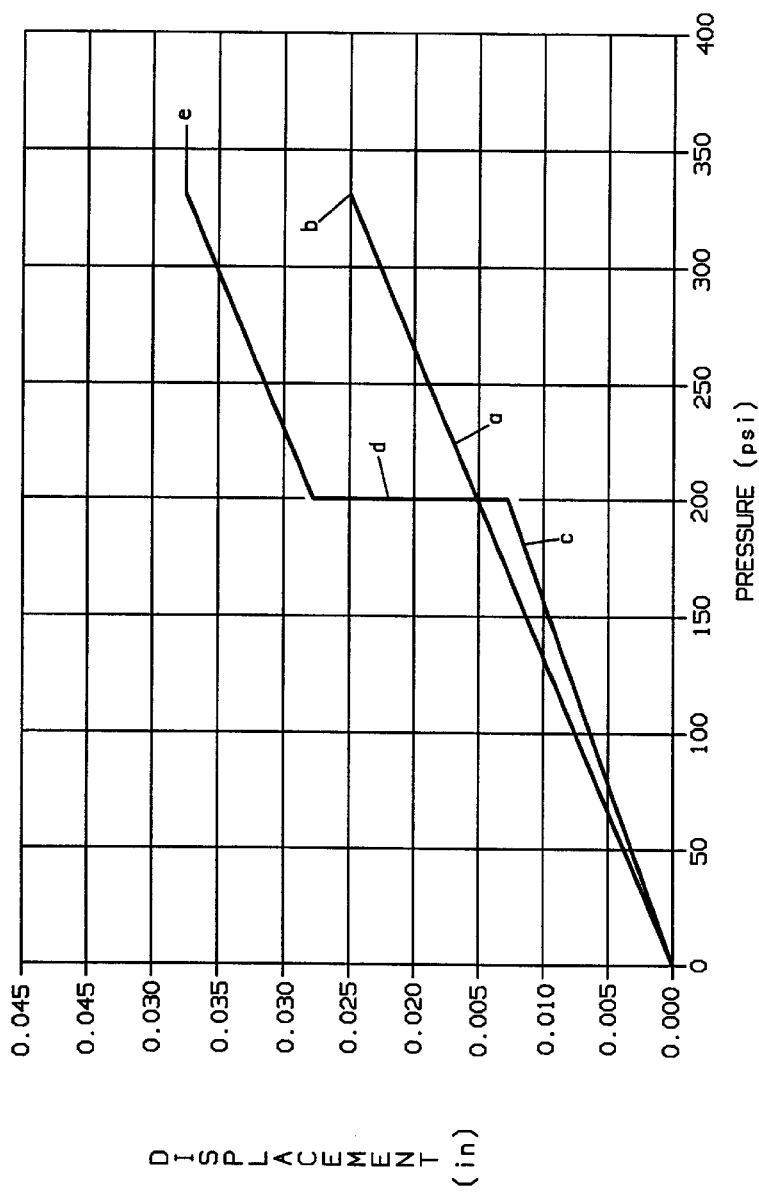
FIG. 12 is a graph showing displacement of the center of a diaphragm (inches) versus pressure (psi) applied to a face surface of the diaphragm for two different diaphragms.
Figure 12B:
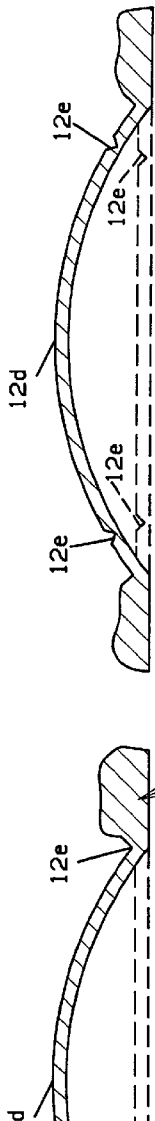
FIGS. 12a and 12b are respective schematic representations of the two diaphragms of the type used in FIG. 12 shown in solid lines in a deflected position prior to breaking of the frangible portion and in dashed lines prior to deflection.
Figure 12A:
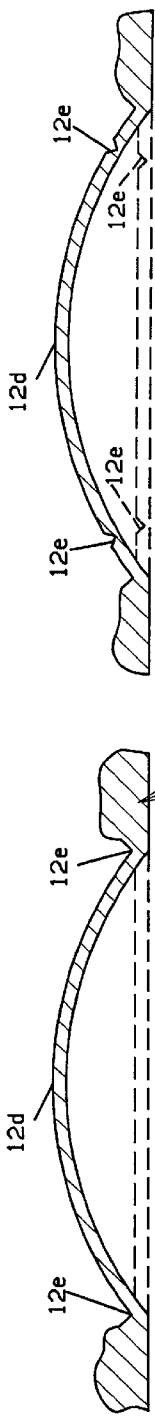

As described above, end cap apparatus 90 of FIG. 10 includes a snap acting, over-pressure feature provided by dished shaped portion 92*b*. This feature is advantageous in avoiding contact chattering if the pressure should hover around the level at which displacement of the diaphragm would drive contact portion 20*a* away from the stationary contact. A sudden large increase in deflection can also be obtained by moving the frangible portion 12e inboard of a supported portion of the diaphragm. With reference to FIG. 12a, frangible portion 12e is located immediately adjacent a thicker portion of header 12, for example, as shown in FIG. 3. This results in displacement of the center of the diaphragm with increasing pressure along a generally straight line "a" of FIG. 12 until the frangible portion 12e breaks at point "b". However, if frangible portion 12e is moved inboard away from the thicker or supported portion of the header as shown in FIG. 12b, the displacement of the center of diaphragm portion 12d follows trace "c" which includes the essentially instantaneous displacement at "d" followed by a further relatively gradual increase until the frangible portion breaks at "e". This sudden displacement occurs when the portion of the diaphragm outboard of frangible portion 12e suddenly moves upwardly, as seen in the figure, hinging at the connection with the thicker or supported portion of the header. As shown in FIG. 12, the sudden increase in displacement occurred at 200 psi, however; the pressure level at which this occurs can be controlled by forming frangible portion 12e closer to the support to increase the pressure level at which the sudden displacement occurs or further from the support to decrease the pressure level at which the sudden displacement occurs.

As noted supra, snap action of the diaphragm is provided by dished portion 92b of FIG. 10. However, even in diaphragm portion 12d of diaphragm cap member 108 of FIG. 11 a certain amount of snap action is obtained. Although as shown in the drawing, diaphragm portion 12d is flat, when frangible section 12e is formed by coining, the material of the diaphragm is displaced causing the diaphragm portion to go into compression, resulting in a slightly concave curved surface of the diaphragm portion when viewed externally of the end cap (not shown). When subjected to pressure from within the electrochemical cell the center portion of the diaphragm will snap over to a concave configuration when the pressure reaches a level sufficient to overcome the compression forces.

Figure 13:
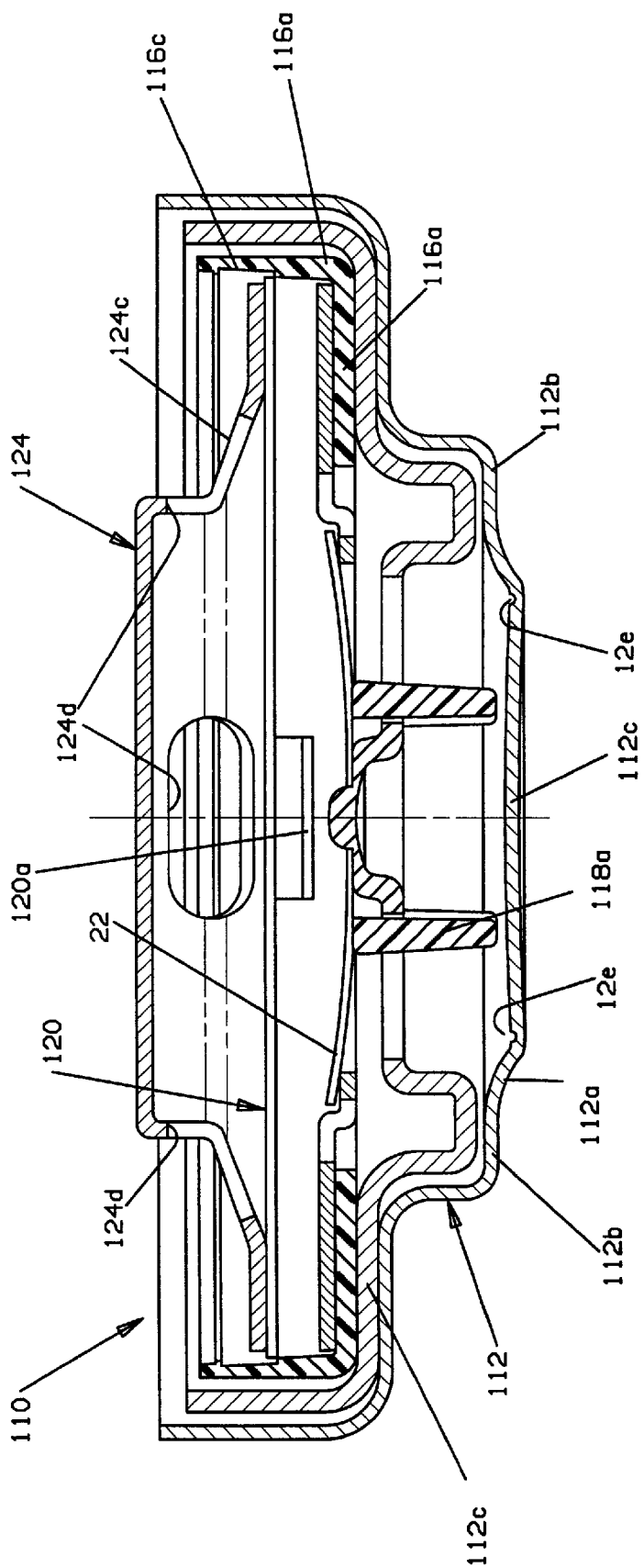
FIG. 13 is an elevational view, in cross section, of another embodiment of an end cap apparatus prior to crimping into its assembled configuration.
Figure 13A:
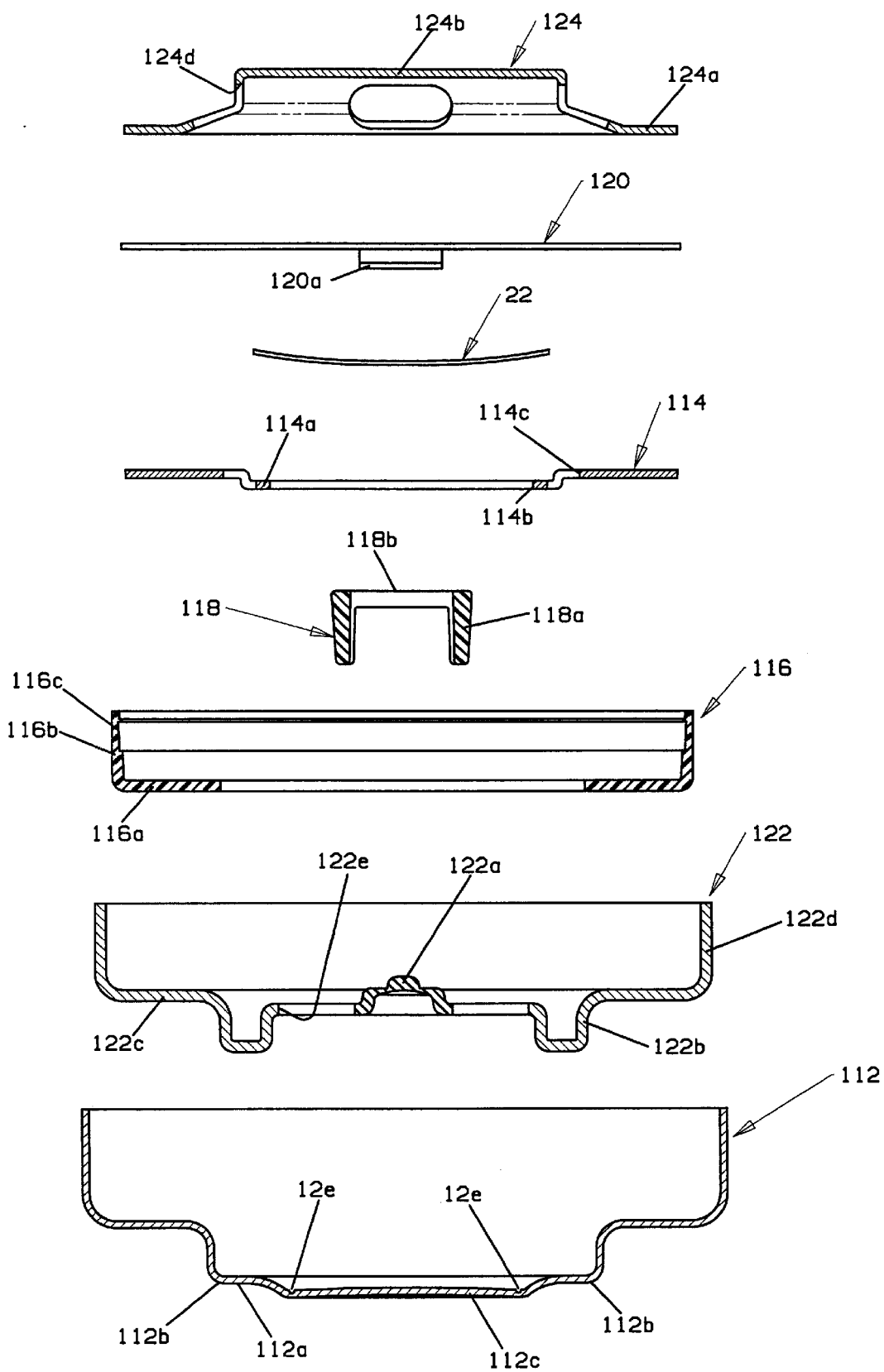
FIG. 13a is an exploded view of the FIG. 13 components.

In FIGS. 13, 13a another variation of the FIGS. 11, 11a embodiment is shown which also includes an improved diaphragm 112, to be described below. A pressure vent and current interrupt device in the form of end cap apparatus 110 comprises a top cap 124 formed of suitable material such as nickel plated cold rolled steel having a flat central portion 124b and circumferential flange 124a with frustoconical intermediate portion 124c. Vent holes 124d are provided in the top cap as in the above described embodiments. A spring member 120 including a movable contact 120a, best seen in FIGS. 13b, 13c formed of suitable material such as nickel plated beryllium copper having a silver plated or inlayed contact portion 120a is disposed beneath the top cap. As seen in FIG. 13c, contact portion 120a is offset from the body of member 120. Spring member 120 is selected to have a low spring rate and therefore is formed to extend as long as space permits within the end cap with the frustoconical portion 124c of the end cap shaped so as not to constrict movement of the spring. Spring member 120 is preferably provided with tab portions 120b which extend radially inwardly from annular body portion 120c with their free distal ends extending to a location inboard of thermally responsive disc member 22 to be discussed. The tabs will serve as a reaction surface against which disc 22 can be loaded. Protrusions 120d extending toward the disc seat 114a may be formed on tabs 120b for this purpose.

Thermally responsive bimetallic disc member 22, the same as that used in the previously described embodiments, is disposed beneath spring member 120 and is received on disc seat 114 of aluminum, nickel plated cold rolled steel or other suitable material. Disc seat 114 is formed with a slightly depressed portion 114a to seat disc 22 and has a central opening 114b and may be formed with apertures 114c around the periphery of the seat portion to enhance venting when the disc is positioned in the seat.

A support 122 which includes stationary contact 122a formed of suitable high strength material such as cold rolled steel, AISI 1008, nickel plated with a silver plate at the centrally located stationary contact 122a is formed with an annular strengthening rib 122b in bottom wall 122c and has an upwardly extending sidewall 122d. Openings 122e are formed through bottom wall 122c on opposite sides of stationary contact 122a which serve both as vent openings as well as to receive therethrough legs 118a depending from annular body portion 118b of motion transfer member 118.

An electrically insulative gasket 116 of suitable material such as Nylon has an annular bottom wall 116a and an upstanding sidewall 116b, preferably formed with an attenuated free end 116c to facilitate bending as will be described. The attenuated portion can also include spaced vertical ribs (not shown) to compliantly center the several components and allow full seating even if any such components are slightly oversized without changing the distance which the motion transfer member must travel.

Diaphragm cap 112 is a generally cup-shaped member, similar to that of 108 in FIG. 11, but is formed with an inclined surface portion or truncated conical portion 112a which may be either straight or curved, disposed in the end of the cap extending between support section 112b aligned with rib 122b and the central portion 112c within franglible portion 12e. As noted above, when frangible 12e is coined, or stamped, the diaphragm material is displaced causing a slight curve, as indicated in FIGS. 13, 13a. The particular angle chosen for the truncated conical portion and the gap between central portion 112c and support section 112b (see FIG. 13), that which creates a vertical offset of, e.g., 0.012 inch, can be adjusted to control the amount of snap movement which can be obtained upon actuation and the actuation pressure.

Diaphragm cap 112, as illustrated in FIG. 13a, receives the several components within its cup shaped configuration forming a leak proof end cap assembly which provides a significant advantage to the cell manufacturer. The parts are easily dropped in place as shown in FIG. 13 and then the sidewalls of the diaphragm cap member 112, the support 122 and the gasket 116 are crimped over as shown in FIG. 14.

Figure 14:
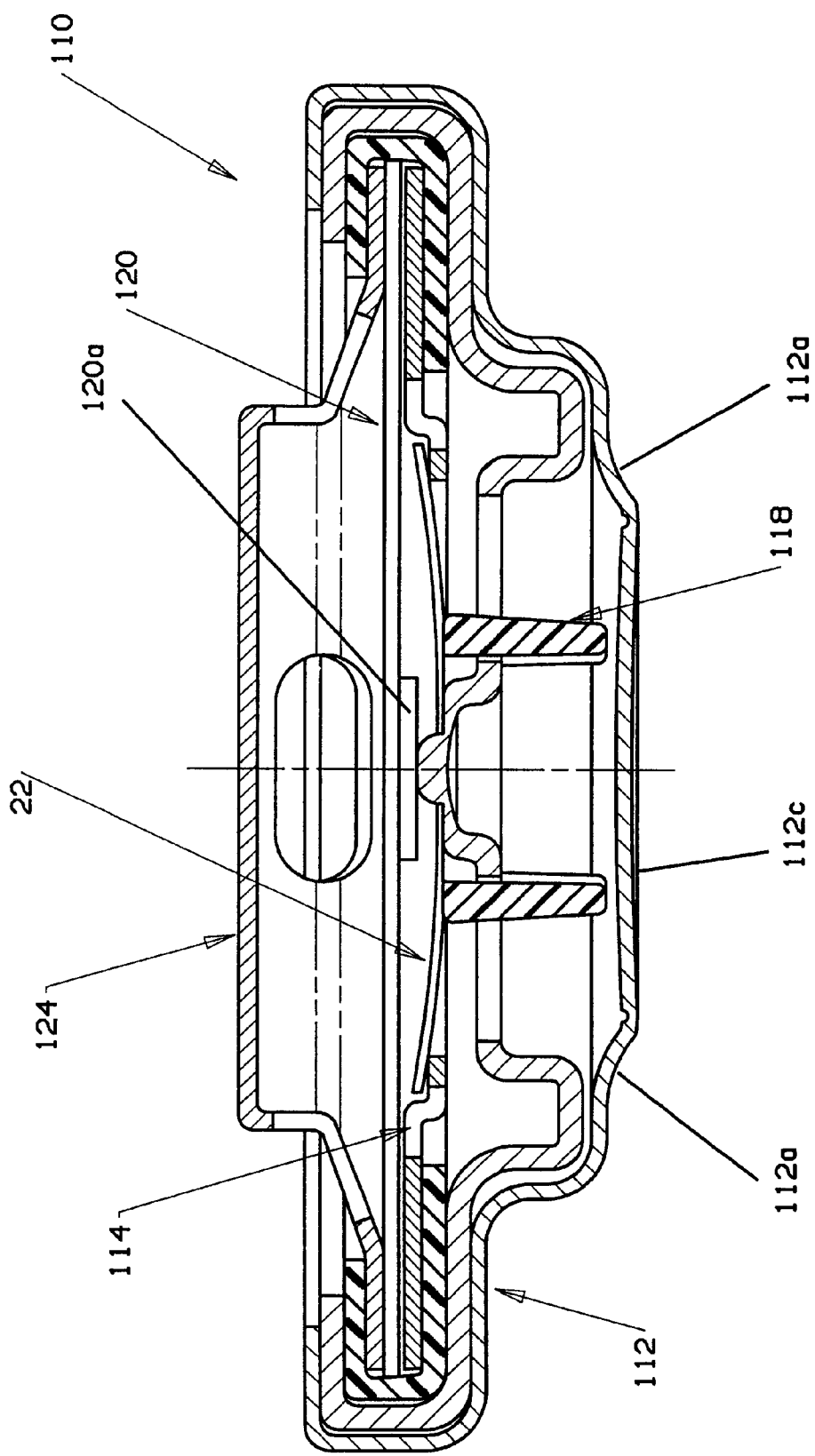
Figure 14A:
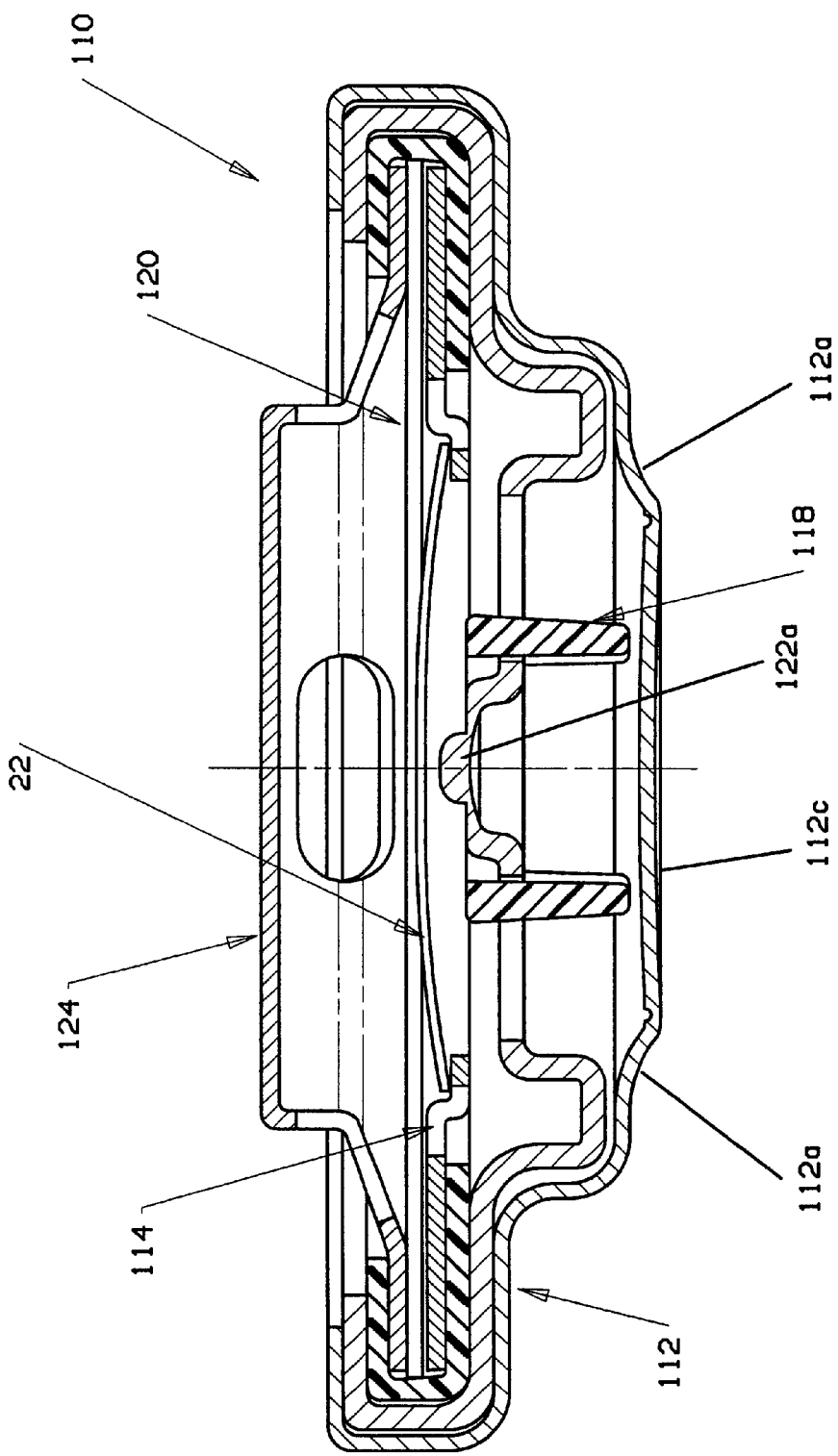
FIGS. 14a, 14b and 14c are views similar to FIG. 14 showing different current interrupt and vent mechanisms.
Figure 14B:
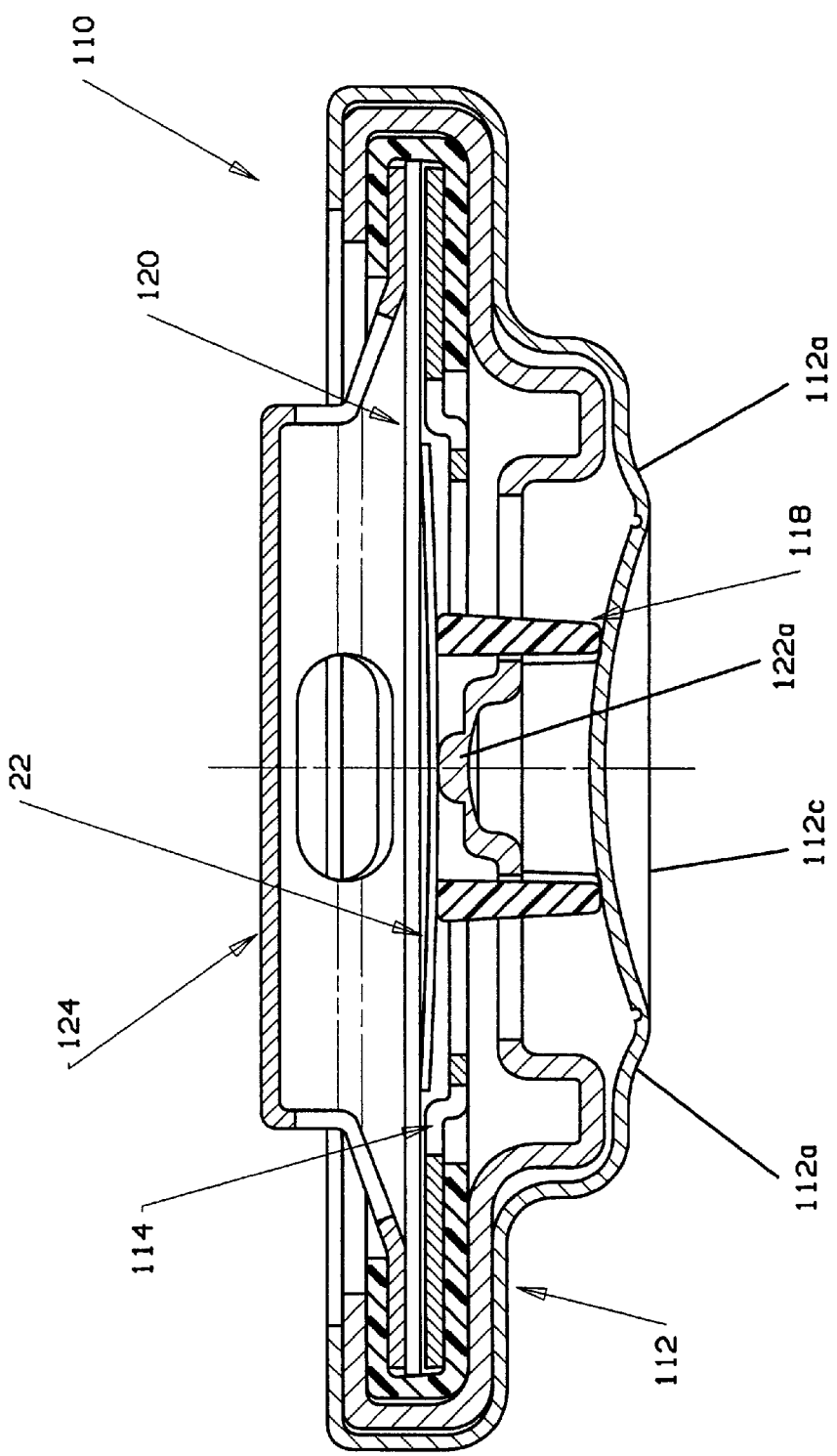
Figure 14C:
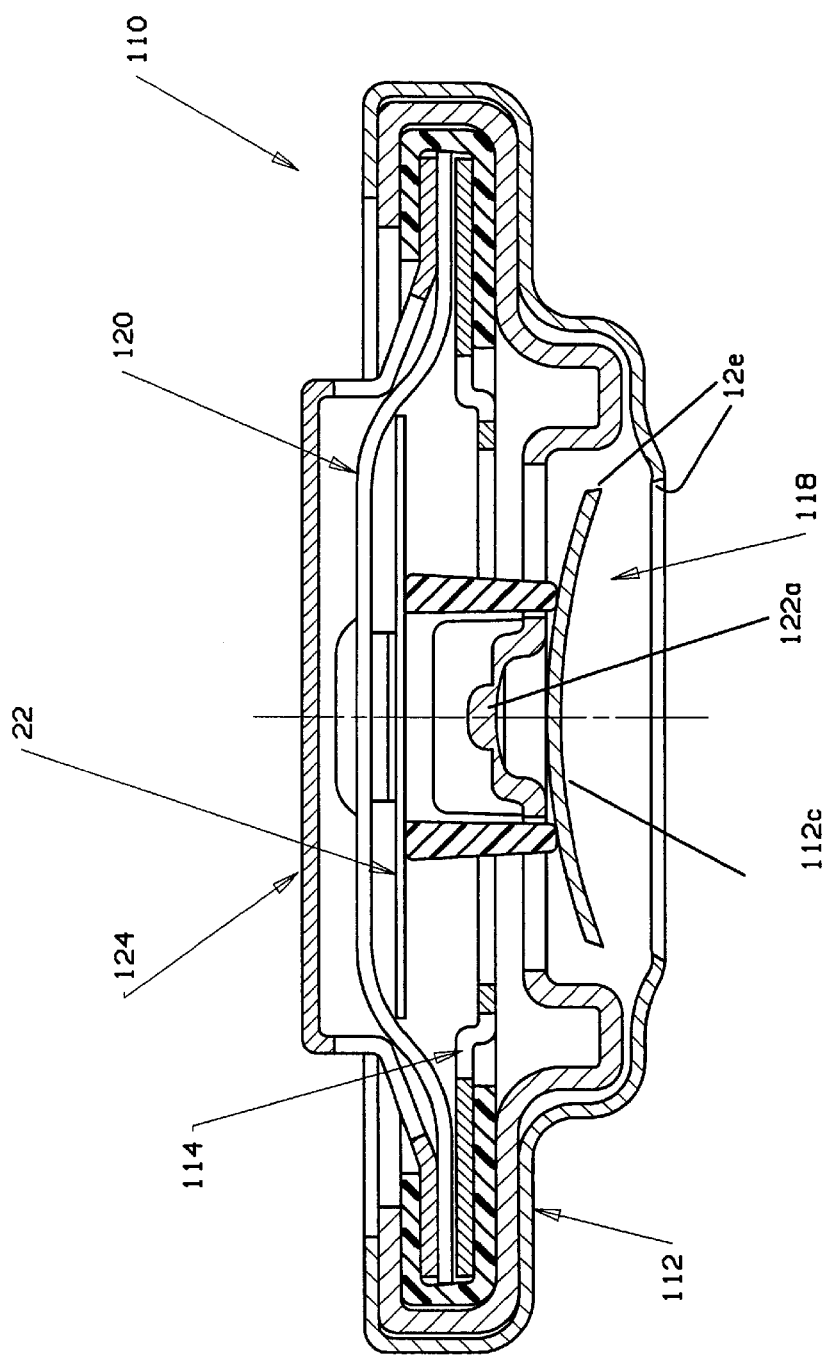

As shown in FIG. 14, the current interrupt apparatus 110 is in the normal closed circuit position with movable contact 120a biased into electrical engagement with stationary contact 122a. FIG. 14a shows current interrupt apparatus 110 when thermal responsive disc 22 has been heated to its actuation temperature, e.g., 80° C. for one type, 110° C. for another type, caused by $I^2r$ heating produced primarily from current flowing through spring member 112 during short circuit or by high ambient temperatures. Disc 22 snaps to its opposite dished configuration lifting movable contact portion 120a out of electrical engagement with stationary contact 122a. In FIG. 14b the interrupt apparatus is shown in the contacts open position caused by internal cell pressure rising to a selected actuation level, e.g., 6 kg/cm², which causes diaphragm center portion 112c and inclined surfaces 112a to buckle with a snap action thereby transferring motion through motion transfer member 118 to disc 22 which in turn moves movable contact 120a away from stationary contact 122a. Current is permanently interrupted without allowing electrolyte to leak from the header. In the event that internal call pressure continues to increase once it reaches a preselected level, e.g., 21 kg/cm$^2$, the coined portion 12e fractures as shown in FIG. 14c allowing gas and electrolyte to escape through vent openings.

Figure 15A:
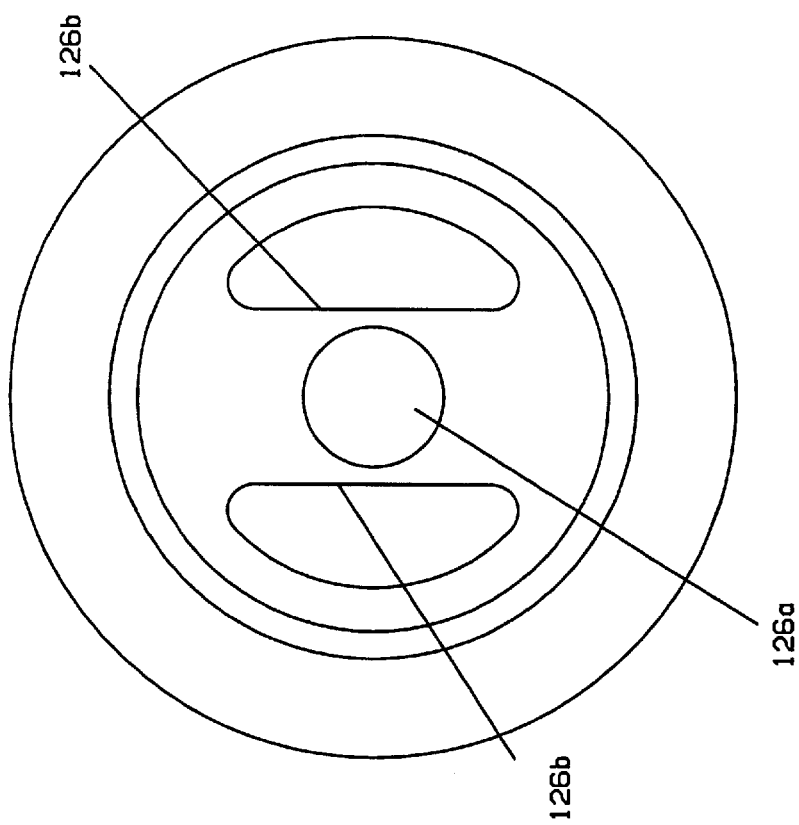
FIGS. 15 and 15a are elevational and bottom plan views respectively of a modified end cap apparatus.
Figure 15:
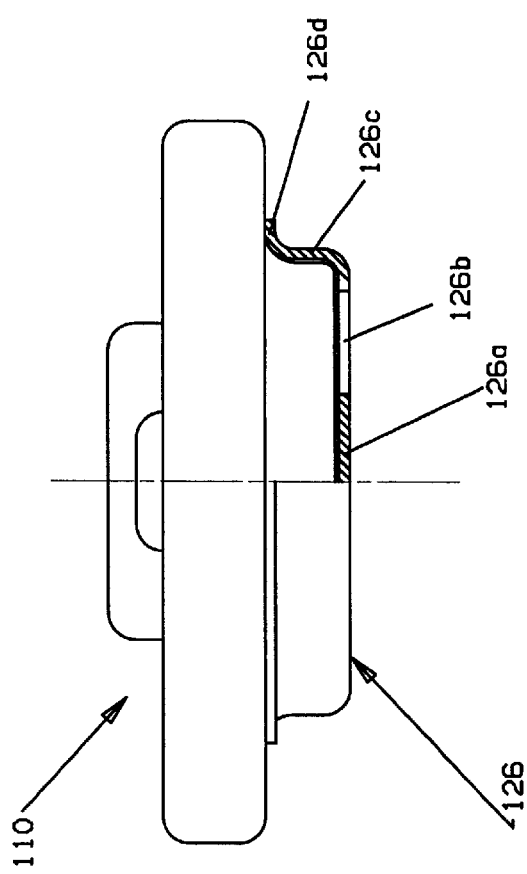

As seen in FIGS. 13 and 14a–14c, diaphragm portion 112c forms a slightly concave configuration when the frangible portion 12e is formed by coining making it somewhat difficult to provide a high production volume, effective welded joint at the unsupported portion of the diaphragm with electrode tab 8 shown in previous drawings. In order to facilitate such attachment of tab 8, a separate cup 126 shown in FIGS. 15, 15a having a flat outer surface 126a (as shown) or slightly convex (not shown) can be placed over the unsupported portions of diaphragm cup member 112. Fluid pressure receiving openings 126b are provided in surface 126a to allow pressurization of diaphragm cup member 112. Cup 126 is provided with a sidewall 126c having an outwardly extending flange 126d at its free end which can be suitably attached to the supported portion of diaphragm cup member 112 as by welding.

Figure 16:
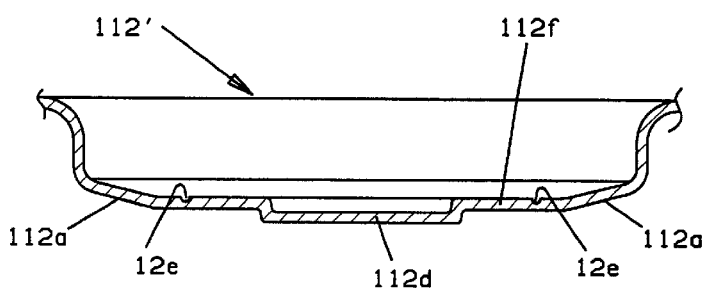
FIG. 16 is a cross section of a diaphragm cap useful in practicing the invention.
Figure 16A:
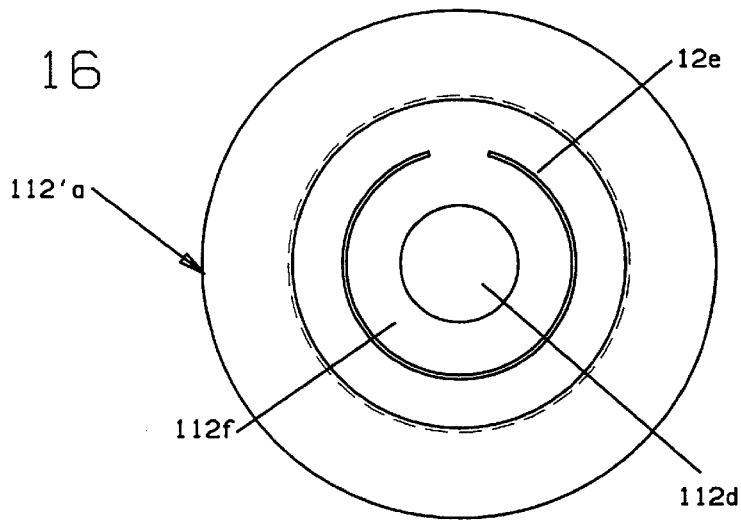
FIG. 16a is a top plan view of FIG. 16.
Figure 16B:
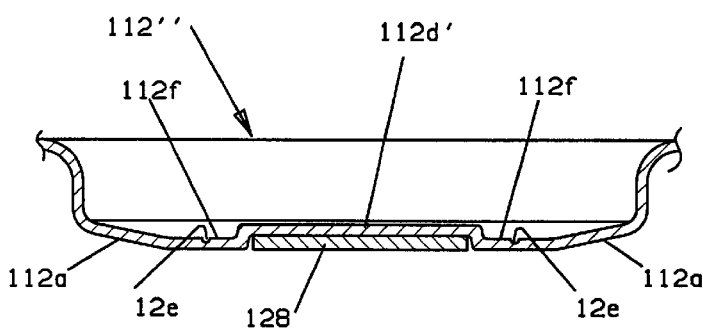
FIGS. 16b and 16c are alternative diaphragm caps useful in practicing the invention.

With reference to FIG. 16, a flat (or convex) surface of the diaphragm cap member 112' for effective welding of electrode tab 8 is provided by forming an offset portion 112d to provide isolation from the coined frangible portion 12e. The forming of offset 112d creates tensional forces which offset compression forces caused by coining so that the inclined surface 112a becomes important in providing effective snap action of the diaphragm cup member 112'. The inclined surface 112a serves as an effective calibration surface by controlling the angle of inclination to provide the amount of translation obtained during snap action as well as actuation pressure and provides increased driving force which can even cause disc 22 to actuate during over-pressure to increase the gap between the contacts. Further adjustment can be obtained by selection of the placement of frangible portion 12e in a flat intermediate surface portion 112f, i.e., selection of the diameter of the frangible portion 12e, for example, the C-shaped portion shown in FIG. 16a. The offset flat portion can be formed to project outwardly as shown in FIG. 16, i.e., away from the end cap apparatus, or inwardly as shown in cap member 112" at 112d' in FIG. 16b. When formed as shown in FIG. 16b a separate, relatively thick disc 128 of suitable material such as aluminum preferably at least as thick as the offset is deep, can be mounted within the offset and welded thereto prior to assembly of the current interrupt apparatus when a suitable anvil type support can be provided. An electrode strap can then be easily laser welded to the thicker disc 128 when the apparatus is installed in an electrochemical cell without the danger of perforating the diaphragm cap member.

Figure 16C:
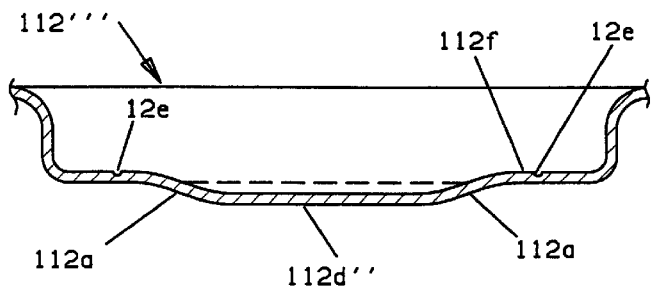
Figure 17:
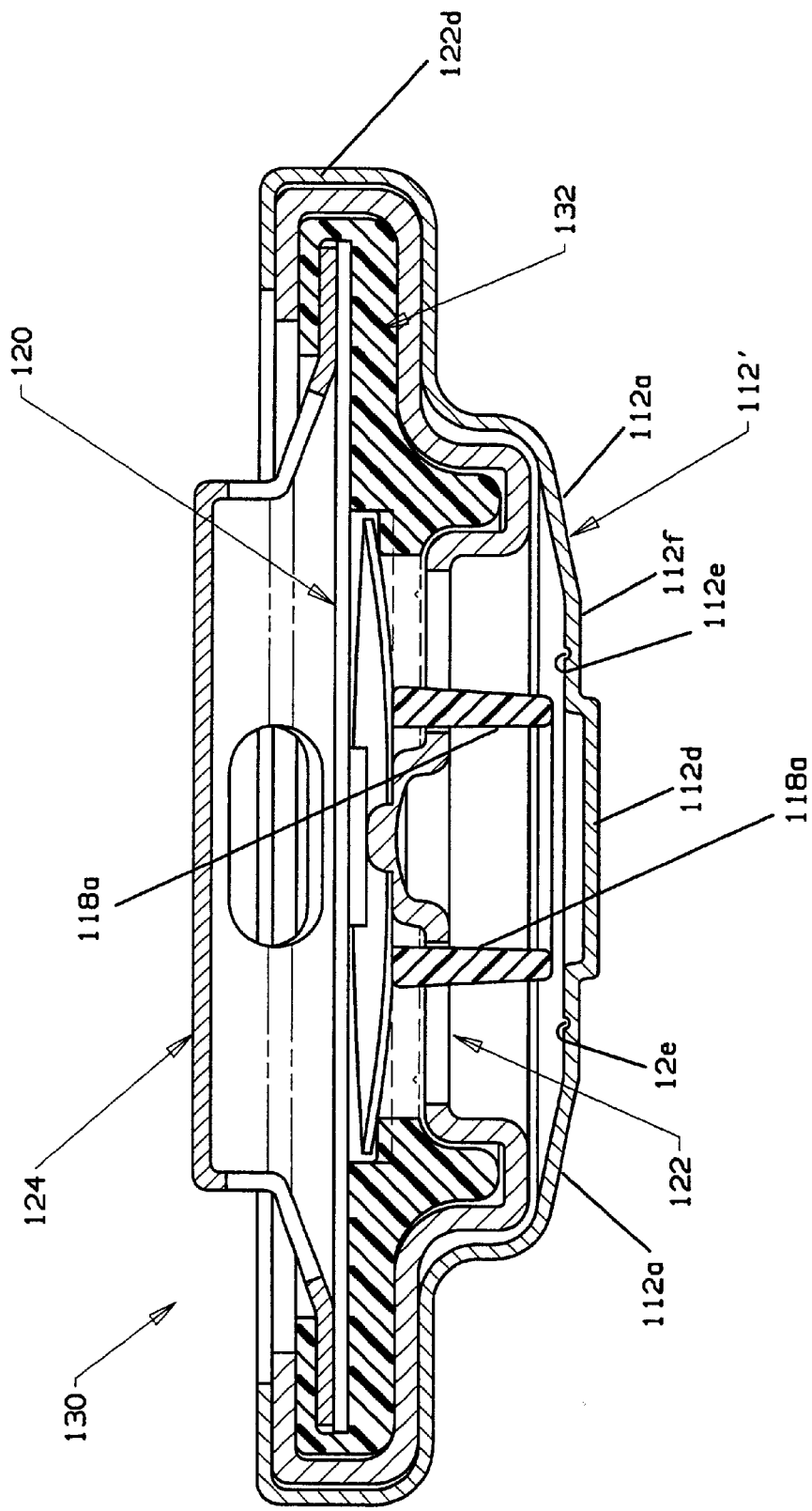
Figure 17A:
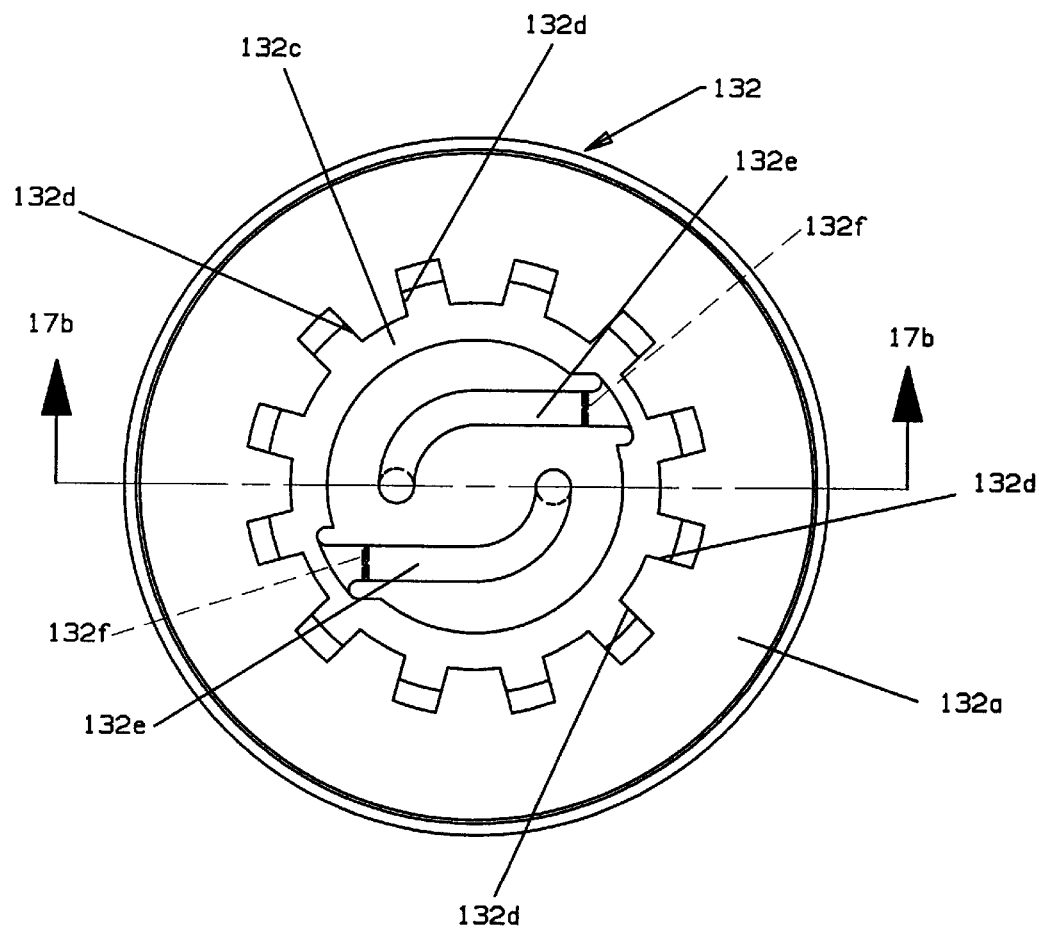
Figure 17B:
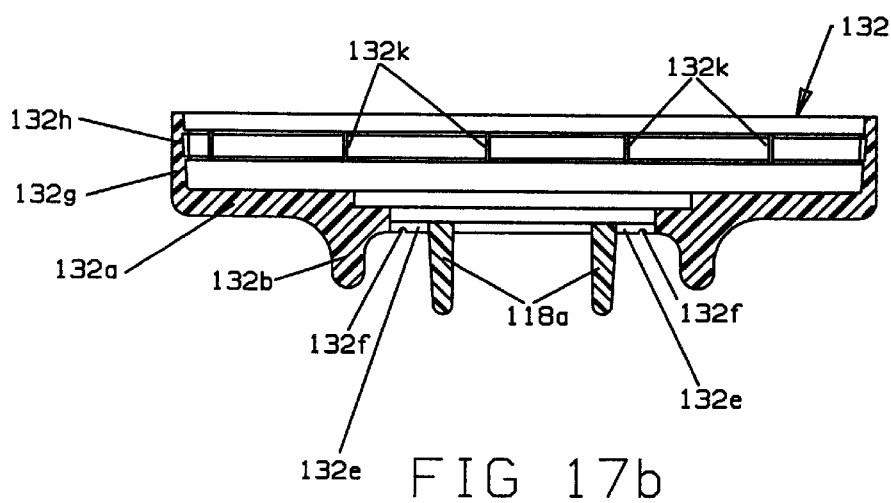

Another variation of the diaphragm cap member is shown in FIG. 16c in which inclined calibration surface 112a is placed inboard of frangible portion 12e in cap member 112'" and serves not only to promote snap action but also to form the offset flat welding portion 112d". This modification allows the provision of a diaphragm cap member having a smaller overall diameter of wall portion 112g when it is needed in electrochemical cells having a reduced available internal space. With reference to FIGS. 17, 17a, 17b, a modified current interrupt apparatus 130 is shown in which the function of various components of the FIG. 13 embodiment are combined to decrease the number of component parts and facilitate handling during assembly. As shown in FIG. 17, current interrupt apparatus 130 includes diaphragm cap member 112' of FIG. 16 with a shortened flat portion 112f between offset portion 112d and inclined portion 112a, however, it will be appreciated that the other diaphragm cap members described above described above could be employed as well. Electrically insulative member 132, formed of suitable material such as nylon, serves to provide electrical isolation between top cap 124 and diaphragm cap member 112', as a disc seat for thermally responsive snap acting disc 22 and as a motion transfer member to transfer motion from diaphragm cup member 112'. With particular reference to FIG. 17a, a top plan view, and FIG. 17b, a cross section, member 132 comprises a generally circular annular base portion 132a having a structural support rib 132b which is received in the space formed by rib 122b of support 122. Disc seat 132c is formed in base portion 132a and is shown with optional vent slots 132d formed around the periphery of disc seat 132d. First and second generally J-shaped motion transfer arms 132e extend inwardly into the bore of the annulus from base portion 132a and each has a respective end formed with a downwardly depending leg 118a. Preferably, a recessed groove 132f is formed across each motion transfer arm 132e to serve as a hinge enhancing flexibility. Base portion 132a is formed as a relatively thick wall which, with support rib 132b provides a stable seat for disc 22. A somewhat thinner sidewall 132g extends upwardly from the outer periphery of base portion 132a which is attenuated at its upper portion 132h to facilitate bending when wall 122d of support 122 and the outer peripheral wall of diaphragm cap member 112' are rolled over to crimp the parts together. Preferably, a plurality of spaced vertically extending ribs 132k are formed in attenuated portion 132h on the inside facing surface to pliably accommodate the composite flange components as they vary in tolerance keeping them properly aligned and fully seated to ensure that the appropriate distance for the motion transfer member to move does not change. The remaining components, i.e., the top cap 124, the spring member 120, support 122 and thermally responsive disc 22 function as described above and need not be repeated.

The invention provides an end cap having a single component which provides a leak proof seal for an electrochemical cell utilizing an appropriate gasket, the component being formed of electrolyte compatible material incorporating a coined pressure diaphragm to actuate a current interrupt device in response to low pressure and vent the electrolyte at elevated pressure. The end cap is characterized in having sufficient structural integrity to allow crimping into a cell in sealed relation without affecting the calibration of safety features mounted within the end cap and is provided with a suitable surface to facilitate attachment of the cell's electrode tab.

Although the invention has been described with regards to specific preferred embodiments thereof, variations and modifications will become apparent to those skilled in the art. For example, in certain electrochemical cells resettable thermostatic discs may be preferred. It is therefore the intention that the appended claims be interpreted as broadly as possible in view of the prior art to include all such variations and modifications.

What is claimed:

1. Electrically conductive end cap apparatus for use with an electromechanical cell comprising an electrically conductive header having a rigid, circumferential flange extending about the periphery thereof, a switch cavity formed in, the header,
   a stationary electrical contact mounted within the switch cavity electrically connected to the header,
   a generally annular insulative member received in the switch cavity, the annular insulative member having a disc seat, an electrically conductive spring member having a movable contact portion movable into and out of electrical engagement with and normally biased into engagement with the stationary contact, a snap acting thermostatic disc having first and second oppositely dished configurations and having a centrally disposed aperture, the disc being received on the disc seat, the stationary electrical contact aligned with the centrally disposed aperture, the stationary contact extending through the centrally disposed aperture when the disc is in one of the first and second configurations, the disc biasing the movable contact away from the stationary contact when in the other of the first and second configurations, an electrically conductive top cap having an outer periphery supported on the annular insulative member and electrically connected to the spring member, the header having a peripherally extending lip deformed over to fixedly grasp the outer peripheral portion of the top cap with a portion of the insulative member therebetween to electrically separate the header from the top cap, the top cap having vent holes formed therethrough, the header having a thin diaphragm extending across the switch cavity formed with a frangible portion aligned with the switch cavity, the frangible portion being breakable when exposed to a selected pressure, the diaphragm being snap-acting when exposed to sufficient increase in pressure up to the selected pressure; and and electrically insulative motion transfer member movably mounted in the switch chamber between the diaphragm and the spring member and having a length selected so that an increase in pressure above a given level will cause the diaphragm to snap to transfer motion to the spring member via the motion transfer member so as to move the movable contact out of engagement with the stationary contact.

2. Electrically conductive end cap apparatus according to claim 1 in which the diaphragm is formed integrally with the header.

3. Electrically conductive end cap apparatus according to claim 1 in which the diaphragm and header are separate elements.

4. Electrically conductive end cap apparatus according to claim 1 in which motion transfer member comprises an elongated pin.

5. Electrically conductive end cap apparatus according to claim 1 in which the motion transfer member comprises a main body portion formed with a plurality of legs.

6. Electrically conductive end cap apparatus according to claim 1 in which the spring member is suspended from the top cap.

7. Electrically conductive end cap apparatus according to claim 1 in which the spring member is supported on the annular insulative member.

8. Electrically conductive end cap apparatus according to claim 1 in which the top cap is overmolded with annular insulative material with the annular insulative material extending over the vent holes.

9. Electrically conductive end cap apparatus according to claim 1 in which the diaphragm has an outer periphery and the frangible portion of the diaphragm is located inboard of the outer periphery of the diaphragm to provide a sudden deflection of the diaphragm at a selected pressure level.

10. Electrically conductive end cap apparatus according to claim 1 in which the diaphragm is formed with a dished configuration so that it will snap from one configuration to an opposite configuration at a selected pressure level.

11. Electrically conductive end cap apparatus according to claim 1 in which the header member is formed of a plate having generally uniform thickness and bent into selected configurations.

12. Electrically conductive end cap apparatus according to claim 1 in which the head member is formed of a block of material having varying thickness.

* * * * *